(12) United States Patent
Shiraishi

(10) Patent No.: US 8,515,209 B2
(45) Date of Patent: Aug. 20, 2013

(54) IMAGE PROCESSING APPARATUS AND METHOD FOR IMAGE PROCESSING

(75) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 458 days.

(21) Appl. No.: 12/805,378

(22) Filed: Jul. 28, 2010

(65) Prior Publication Data

US 2011/0033125 A1 Feb. 10, 2011

(30) Foreign Application Priority Data

Aug. 6, 2009 (JP) ................................. 2009-183822

(51) Int. Cl.
*G06K 9/32* (2006.01)

(52) U.S. Cl.
USPC ............ 382/299; 382/232; 382/277; 382/276

(58) Field of Classification Search
USPC .................. 382/299, 232; 345/538, 501, 555
See application file for complete search history.

(56) References Cited

U.S. PATENT DOCUMENTS

| | | | | |
|---|---|---|---|---|
| 4,463,372 A | * | 7/1984 | Bennett et al. ................ | 348/580 |
| 4,908,874 A | * | 3/1990 | Gabriel .......................... | 382/277 |
| 4,941,193 A | * | 7/1990 | Barnsley et al. ............. | 382/249 |
| 5,758,034 A | * | 5/1998 | Loce et al. ..................... | 358/1.2 |
| 5,862,305 A | * | 1/1999 | Girmay et al. ................ | 358/1.2 |
| 5,875,268 A | * | 2/1999 | Miyake ......................... | 382/276 |
| RE36,145 E | * | 3/1999 | DeAguiar et al. ............ | 345/538 |
| 6,496,608 B1 | * | 12/2002 | Chui ............................. | 382/300 |
| 6,597,811 B1 | * | 7/2003 | Batkilim et al. .............. | 382/232 |
| 6,782,133 B2 | * | 8/2004 | Yokose et al. ................ | 382/232 |
| 7,085,379 B1 | | 8/2006 | Kagechi et al. | |
| 7,352,915 B2 | * | 4/2008 | Nose et al. .................... | 382/275 |
| 7,689,048 B2 | * | 3/2010 | Matsumoto et al. .......... | 382/232 |
| 7,876,978 B2 | * | 1/2011 | Berger et al. ................. | 382/299 |
| 2002/0001411 A1 | * | 1/2002 | Suzuki et al. ................. | 382/238 |
| 2005/0063596 A1 | * | 3/2005 | Yomdin et al. ............... | 382/232 |
| 2007/0053614 A1 | * | 3/2007 | Mori et al. .................... | 382/299 |

FOREIGN PATENT DOCUMENTS

| | | |
|---|---|---|
| JP | 02-248162 | 10/1990 |
| JP | 08-174919 | 7/1996 |

(Continued)

OTHER PUBLICATIONS

Office Action for corresponding Japanese Application No. 2009-183822 dated Feb. 5, 2013.

(Continued)

*Primary Examiner* — Vu Le
*Assistant Examiner* — Aklilu Woldemariam
(74) *Attorney, Agent, or Firm* — Harness, Dickey & Pierce

(57) ABSTRACT

While a natural image having a resolution of 600 dpi is enlarged at a predetermined magnification ratio and is printed at a resolution of 1200 dpi, if the magnification ratio is equal to or more than two, the natural image is enlarged by using a nearest neighbor method. If the magnification ratio is less than two, a reduction image is generated by reducing an enlargement image obtained by enlarging an object image based on a magnification ratio to 1/2, and the reduction image is enlarged to twice the size by using the nearest neighbor method. The natural image obtained by enlarging in this manner is compressed and encoded by using prediction encoding and run-length encoding with which a run-length value having a prediction error of 0 is calculated.

10 Claims, 27 Drawing Sheets

(56) References Cited

FOREIGN PATENT DOCUMENTS

| | | |
|---|---|---|
| JP | 2888186 | 2/1999 |
| JP | 2001-157062 | 6/2001 |
| JP | 2001-157226 | 6/2001 |
| JP | 2001-245159 | 9/2001 |
| JP | 2006-174330 | 6/2006 |
| JP | 2008-123349 | 5/2008 |

OTHER PUBLICATIONS

Abstract of Japan Publication No. 09-224253 Published Aug. 26, 1997.

\* cited by examiner

FIG. 26A

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PREVIOUS LINE | 30 | 30 | 30 | 25 | 25 | 25 | 90 | 90 | 90 | 90 | 30 | 30 | 30 | 30 | 90 | 90 |
| CURRENT LINE | 30 | 30 | 25 | 25 | 25 | 25 | 90 | 90 | 90 | 90 | 30 | 30 | 30 | 90 | 90 | 90 |
| PREDICTION VALUE | – | – | 30 | 25 | 25 | 25 | 25 | 90 | 90 | 90 | 90 | 30 | 30 | 30 | 30 | 90 |
| PIXEL VALUE | 30 | 30 | 25 | 25 | 25 | 25 | 90 | 90 | 90 | 90 | 30 | 30 | 30 | 90 | 90 | 90 |
| PREDICTION ERROR | – | 0 | –5 PREDIC- TION ERROR | 0 | 0 | 0 | 0 | 0 | 0 | 0 | 0 | 0 | 0 | +60 | 0 | 0 |
| PIXEL CODE | PASS | – | – | – | – | – | – | – | – | – | – | – | – | PASS | – | – |
| RUN-LENGTH CODE | – | 2 | – | – | – | – | – | – | – | – | – | – | 10 | – | – | 3 |

FIG. 26B

| LINE HEADER | PASS (30) | RUN-LENGTH (2) | PREDICTION ERROR (-5) | RUN-LENGTH (10) | PASS (90) | RUN-LENGTH (3) |

| | #0 | #1 | #2 | #3 |
|---|---|---|---|---|
| #0 | 30 | 30 | 0 | 0 |
| #1 | 30 | 30 | 0 | 0 |
| #2 | 20 | 20 | 90 | 90 |
| #3 | 20 | 20 | 90 | 90 |
| #4 | 0 | 0 | 30 | 30 |
| #5 | 0 | 0 | 30 | 30 |
| #6 | 30 | 30 | 20 | 20 |
| #7 | 30 | 30 | 20 | 20 |
| #8 | 90 | 90 | 0 | 0 |
| #9 | 90 | 90 | 0 | 0 |
| #10 | 30 | 30 | 20 | 20 |
| #11 | 30 | 30 | 20 | 20 |
| #12 | 20 | 20 | 30 | 30 |
| #13 | 20 | 20 | 30 | 30 |
| #14 | 0 | 0 | 90 | 90 |
| #15 | 0 | 0 | 90 | 90 |

FIG. 27C

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| (PREVIOUS LINE)#1 | 30 | 30 | 20 | 20 | 0 | 0 | 30 | 30 | 90 | 90 | 30 | 30 | 20 | 20 | 0 | 0 |
| (CURRENT LINE)#2 | 0 | 0 | 90 | 90 | 30 | 30 | 20 | 20 | 0 | 0 | 20 | 20 | 30 | 30 | 90 | 90 |
| PREDICTION VALUE | – | 0 | 0 | 90 | 70 | 30 | 30 | 20 | 80 | 0 | 0 | 20 | 20 | 30 | 10 | 90 |
| PIXEL VALUE | 0 | 0 | 90 | 90 | 30 | 30 | 20 | 20 | 0 | 0 | 20 | 20 | 30 | 30 | 90 | 90 |
| PASS | – | 0 | +90 | 0 | –40 | 0 | –10 | 0 | –80 | 0 | +20 | 0 | +10 | 0 | +80 | 0 |
| PIXEL CODE | PASS | PASS | PASS | PASS | PASS | PASS | PREDIC- TION ERROR | PREDIC- TION ERROR | PASS | PASS | PREDIC- TION ERROR | PREDIC- TION ERROR | PREDIC- TION ERROR | PREDIC- TION ERROR | PASS | PASS |
| RUN-LENGTH CODE | – | 2 | – | 2 | – | 2 | – | 2 | – | 2 | – | 2 | – | 2 | – | 2 |

FIG. 27D

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| (PREVIOUS LINE)#2 | 0 | 0 | 90 | 90 | 30 | 30 | 20 | 20 | 0 | 0 | 20 | 20 | 30 | 30 | 90 | 90 |
| (CURRENT LINE)#3 | 0 | 0 | 90 | 90 | 30 | 30 | 20 | 20 | 0 | 0 | 20 | 20 | 30 | 30 | 90 | 90 |
| PREDICTION VALUE | – | 0 | 90 | 90 | 30 | 30 | 20 | 20 | 0 | 0 | 20 | 20 | 30 | 30 | 90 | 90 |
| PIXEL VALUE | 0 | 0 | 90 | 90 | 30 | 30 | 20 | 20 | 0 | 0 | 20 | 20 | 30 | 30 | 90 | 90 |
| PREDICTION ERROR | – | 0 | 0 | 0 | 0 | 0 | 0 | 0 | 0 | 0 | 0 | 0 | 0 | 0 | 0 | 0 |
| PIXEL CODE | PASS | – | – | – | – | – | – | – | – | – | – | – | – | – | – | – |
| RUN-LENGTH CODE | – | – | – | – | – | – | – | – | – | – | – | – | – | – | – | 15 |

IMAGE PROCESSING APPARATUS AND METHOD FOR IMAGE PROCESSING

CROSS-REFERENCE TO RELATED APPLICATIONS

The present application claims priority to and incorporates by reference the entire contents of Japanese Patent Application No. 2009-183822 filed in Japan on Aug. 6, 2009.

BACKGROUND OF THE INVENTION

1. Field of the Invention

The present invention relates to an image processing apparatus and a method for image processing used to compress and encode image data.

2. Description of the Related Art

In image forming devices such as a printing device, printing operation is performed by temporarily storing received image data into a memory, and reading out the image data stored in the memory at a predetermined timing. In this case, a large capacity of memory is required to store the image data into the memory without change, thereby increasing the costs of apparatus. Accordingly, in general, received image data is stored in a memory by compressing and encoding the image data. To compress and encode image data, a prediction encoding method is generally used. The prediction encoding method predicts a pixel value of an attention pixel from a pixel value of pixels surrounding the attention pixel, by using characteristics in which adjacent pixels in an image have high correlation.

Japanese Patent No. 2888186 discloses an image encoding apparatus including a plurality of predicting units and prediction error calculating units, a selecting unit that selects the plurality of predicting units and prediction error calculating units, and an encoding unit that encodes identification numbers of the prediction error calculating units and predicting units. In Japanese Patent No. 2888186, the length correctly predicted by the predicting units is encoded by run-length, and if the prediction is not correct, the prediction error calculated by the prediction error calculating unit is encoded.

With reference to FIG. 30, a general data flow in a printing device when image data is compressed and encoded is schematically described. In an example in FIG. 30, a printing device includes an electrical control device 500 and a printer engine 504. The electrical control device 500 includes a controlling unit 501, an image processing unit 502, and a main memory 503. In the electrical control device 500, the controlling unit 501 and the image processing unit 502 are connected with a bus 505.

The controlling unit 501 generates drawing data based on page description language (PDL) data supplied from, for example, a computer (PC) 550 through a network 551 and a communication controller 516, and controls the generated drawing data exchanged between the main memory 503 and the image processing unit 502. The image processing unit 502 stores the drawing data into the main memory 503 by compressing and encoding the drawing data. The image processing unit 502 also decodes the compressed and encoded drawing data and sends to the printer engine 504.

In such a structure, for example, drawing is performed by a central processing unit (CPU) 510 based on PDL data supplied, to the controlling unit 501 from the PC 550, thereby generating multi-valued band data of cyan, magenta, yellow, and black (CMYK) plates. The multi-valued band data is stored in a multi-valued CMYK band data storage area 520 of the main memory 503 through a memory arbiter (ARB) 512 (passage A). A CPU interface (I/F) 511 and a memory controller 514 control data transmission between the memory arbiter 512 and the CPU 510, and between the memory arbiter 512 and the main memory 503. A Direct Memory Access Controller (DMAC) 513 controls an access to the main memory 503.

For example, C-plate band data stored in the CMYK band data storage area 520 of the main memory 503 is read out from the main memory 503 by a DMA controller, which is not shown, in the image processing unit 502, and is supplied to an encoding unit 532 through the bus 505 (passage B). Data transmission on the bus 505 is controlled by a bus controller 515 and a bus I/F 531.

The encoding unit 532 compresses and encodes the supplied C-plate band data by using prediction encoding and the like. C-plate band code data obtained by compressing and encoding the C-plate band data is sequentially stored in a multi-valued CMYK page code storage area 521 in the main memory 503 through the bus 505. The encoding unit 532 sequentially performs encoding of band data for each band data of CMYK plates.

If data for one page is stored therein, C-plate band code data as much as one page is sequentially read out from the multi-valued CMYK page code storage area 521, and supplied to a decoding unit 533 in the image processing unit 502 through the bus 505 as C-plate page code data (passage C). The decoding unit 533 decodes a compression code of the supplied C-plate page code data, and outputs as C-plate page data. Predetermined image processing is applied to the C-plate page data by an image processing unit 534, and is supplied to the printer engine 504 through an engine controller 535. The printer engine 504 performs printing at a predetermined speed, based on the supplied C-plate page data.

The reading out of the band code data from the multi-valued CMYK page code storage area 521, decoding by the decoding unit 533, and printing performed by the printer engine 504 are sequentially performed on each page of CMYK plates, in synchronization with the printer engine 504.

Japanese Patent Application Laid-open No. H8-174919 discloses a technology in which high-resolution printing is performed on text data and computer graphics (CG) data, and high-gradation printing is performed on image data such as a natural image like a photograph or a picture. According to Japanese Patent Application Laid-open No. H8-174919, an amount of data to be processed is reduced by switching processes based on the type of data, thereby reducing costs by improving printing speed and saving memory.

In other words, in Japanese Patent Application Laid-open No. H8-174919, image data of a natural image, for example, is produced by a multi-value of a low-resolution of 300 dots per inch (dpi) and a bit depth of 8 bits, encoded by the multi-value, and stored in the memory. Text data and CG data, for example, are produced by a small value of a high-resolution of 600 dpi and a bit depth from 2 to 4 bits, encoded by the small value, and stored in the memory. The amount of data is reduced and printing speed is improved, by reading the code encoded by the multi-value and the code encoded by the small value from the memory during printing, combining the codes, and printing them.

Japanese Patent Application Laid-open No. 2001-157062 discloses a technology in which printing process is completed in a predetermined printing time, by compressing image data to be printed, transferring and decompressing the data through a common bus, and performing printing. Japanese Patent Application Laid-open No. 2001-157062 prevents the transfer speed of the common bus in a controller from being the bottleneck of processing speed.

Japanese Patent Application Laid-open No. 2001-245159 discloses a technology in which, when compressed image data is generated by compressing image data received from a scanner and is output to the bus, a resolution of input image data can be adaptively switched corresponding to the production speed of compressed image data. In Japanese Patent Application Laid-open No. 2001-245159, whether production speed of compressed image data exceeds the output speed of the compressed image data to the bus is determined. If the production speed exceeds the output speed, a resolution of the input image data is reduced. Compression processing and output to the bus are repeated relative to the input image data having the low resolution.

In a printing device and the like, as illustrated in the passage C in FIG. 30, printing is performed by reading page code data of CMYK plates obtained by compressing and encoding drawing data from the main memory 503 through the bus 505, and decoding the data by the decoding unit 533, by synchronizing with the printer engine 504. At this time, if the compression ratio of the page code data is worse than expected, the transmission rate of the page code data synchronized with the printer engine 504 may exceed the transfer rate of the bus 505, thereby preventing the page code data from being printed normally.

In particular, because the correlation between pixels is small in image data of a natural image, prediction obtained by prediction encoding may not be correct. Particularly, if image data of a natural image, and text data and CG data are mixed on one page, compression ratio may be worse than expected.

In Japanese Patent Application Laid-open No. H8-174919, when text data and CG data, and image data of a natural image are combined on one page to be printed, logic operation between the text data and CG data produced by a small value and the image data produced by a multi-value is difficult.

In Japanese Patent Application Laid-open No. 2001-157062, a Joint Bi-level Image Coding Expert Group (JBIG) is used as a compression encoding method of drawing data. The JBIG allows progressive transmission of image by forming an image pyramid and sequentially transmitting an image from an image with a rough resolution. If a compression ratio for realizing a target transmission rate cannot be obtained, only a low resolution layer is converted into compression data. However, in this case, resolution of the whole printer image to be printed is lowered, thereby reducing the image quality of an image portion of text data and CG data with which high resolution is particularly demanded. The same problem also applies to Japanese Patent Application Laid-open No. 2001-245159.

SUMMARY OF THE INVENTION

It is an object of the present invention to at least partially solve the problems in the conventional technology.

According to an aspect of the present invention, there is provided an image processing apparatus that compresses and encodes an image formed of multi-valued image data, the image processing apparatus including an enlarging unit that enlarges the image by interpolating a pixel of the image by using a pixel copied corresponding to a magnification ratio, a predicting unit that calculates a prediction value relative to an attention pixel of an image obtained by enlarging the image by the enlarging unit, based on a pixel value of the attention pixel and a pixel value of a pixel surrounding the attention pixel, a predicting error unit that calculates an error value of the prediction value relative to the pixel value of the attention pixel, and a code generating unit that encodes the pixel value of the attention pixel or the error value.

According to another aspect of the present invention, there is provided a method for image processing by which an image formed of multi-valued image data is compressed and encoded, the method for image processing including enlarging the image by interpolating a pixel of the image by using a pixel copied corresponding to a magnification ratio, predicting a prediction value relative to an attention pixel of an image obtained by enlarging the image at the enlarging, based on a pixel value of the attention pixel and a pixel value of a pixel surrounding the attention pixel, predicting error of the prediction value by calculating an error value relative to the pixel value of the attention pixel, and code generating at which the pixel value of the attention pixel or the error value is encoded.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 26A is a schematic of an encoding process of a graphic image in the present embodiment described in more detail;

FIG. 26B is a schematic of an encoding process of a graphic image in the present embodiment described in more detail;

FIG. 27A is a schematic for explaining an encoding process of a natural image in the present embodiment described in more detail;

FIG. 27B is a schematic for explaining an encoding process of a natural image in the present embodiment described in more detail;

FIG. 27C is a schematic for explaining an encoding process of a natural image in the present embodiment described in more detail;

FIG. 27D is a schematic for explaining an encoding process of a natural image in the present embodiment described in more detail;

DETAILED DESCRIPTION OF THE PREFERRED EMBODIMENTS

Figure 1:
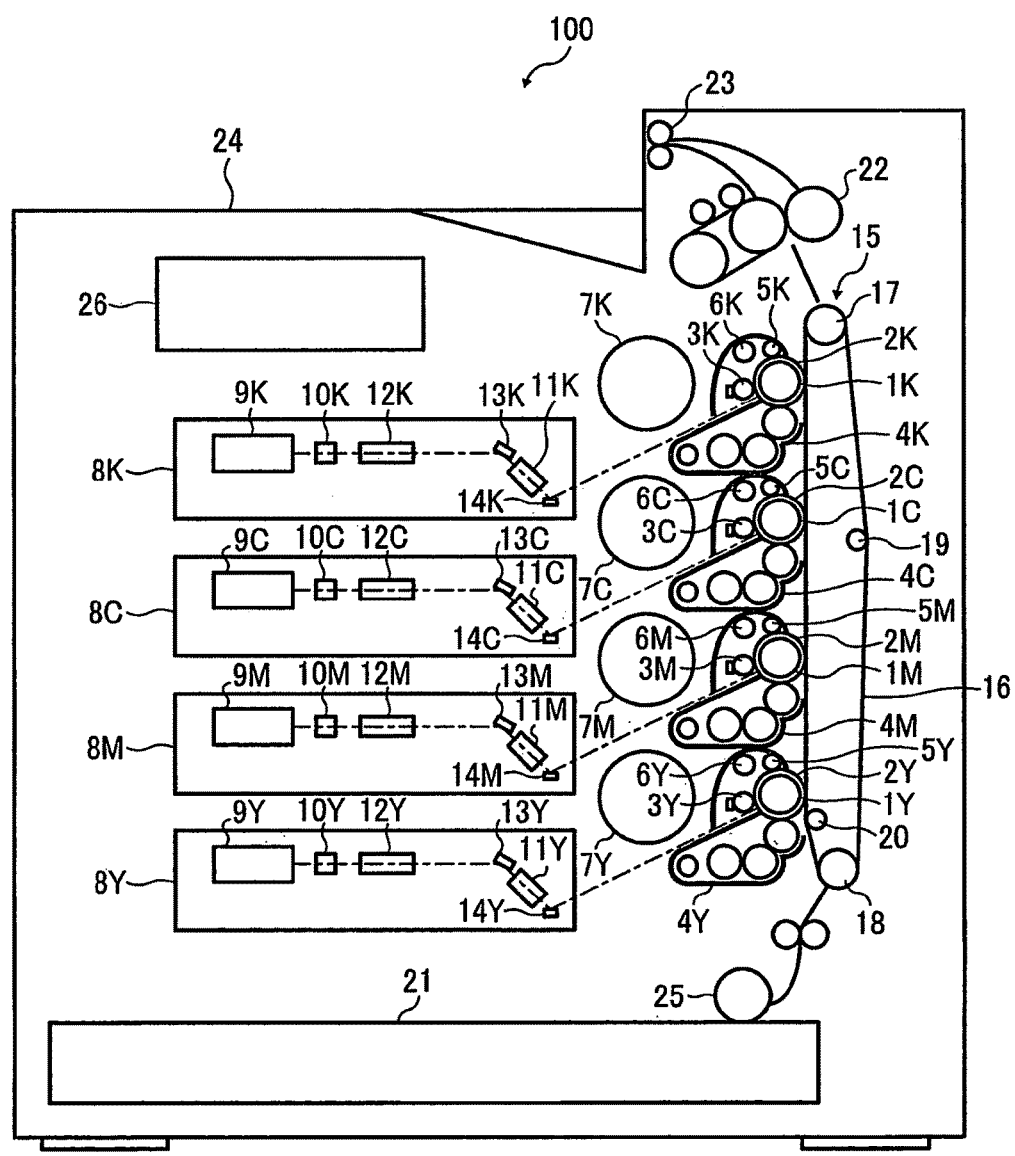
FIG. 1 is a schematic of a mechanism unit of an image forming device to which an image processing apparatus according to an embodiment of the present invention is applicable.

Exemplary embodiments of an image processing apparatus according to the present invention will be described below in greater detail with reference to the accompanying drawings. FIG. 1 is an example of a mechanism unit of an image forming device (referred to as color printer) to which an image processing apparatus according to an embodiment of the present invention is applicable. The present embodiment describes an example in which the image processing apparatus and a method for image processing according to the present invention are applicable to the image forming device, which is a color printer. However, it is not limited thereto and any image processing apparatus and method for image processing capable of executing image processing on an image including a character image can be employed. For example, the present invention is applicable to an image processing apparatus such as a copier, facsimile, and a multifunction product.

Example of Printer Applicable to Embodiment

A color printer 100 illustrated in FIG. 1 is a four-drum tandem engine type image forming device in which images of four colors (yellow (Y), magenta (M), cyan (C), and black (K)) are individually formed by image creating systems 1Y, 1M, 1C, and 1K, and the four color images are combined. Each of the image creating systems 1Y, 1M, 1C, and 1K includes a photosensitive body as an image carrier, such as Organic Photoconductor (OPC) drums 2Y, 2M, 2C, and 2K having small diameters. Charging rollers 3Y, 3M, 3C, and 3K as charging units, developing devices 4Y, 4M, 4C, and 4K that form a toner image of each of the colors Y, M, C, and K by developing electrostatic latent images on the OPC drums 2Y, 2M, 2C, and 2K with a developer, cleaning devices 5Y, 5M, 5C, and 5K, neutralization devices 6Y, 6M, 6C, and 6K, and the like, are arranged so as to surround the OPC drums 2Y, 2M, 2C, and 2K from the upstream side of image forming.

Toner bottle units 7Y, 7M, 7C, and 7K that supply Y toner, M toner, C toner, and K toner to the developing devices 4Y, 4M, 4C, and 4K, respectively, are arranged beside the developing devices 4Y, 4M, 4C, and 4K. The image creating systems 1Y, 1M, 1C, and 1K include optical writing devices 8Y, 8M, 8C, and 8K, respectively. The optical writing devices 8Y, 8M, 8C, and 8K include optical components such as laser diode (LD) light sources 9Y, 9M, 9C, and 9K, collimating lenses 10Y, 10M, 100, and 10K, fθ lenses 11Y, 11M, 11C, and 11K, and polygon mirrors 12Y, 12M, 12C and 12K as deflecting and scanning units, folding mirrors 13Y, 13M, 13C, 13K, 14Y, 14M, 14C, and 14K, and the like.

The image creating systems 1Y, 1M, 1C, and 1K are aligned vertically, and a transfer belt unit 15 is disposed at the right side of the image creating systems 1Y, 1M, 1C, and 1K, so as to come into contact with the OPC drums 2Y, 2M, 2C, and 2K. In the transfer belt unit 15, a transfer belt 16 is stretched by rollers 17 to 20, and is rotatably driven by a drive source, which is not illustrated. A paper feed tray 21 that stores therein transfer paper as recording medium is disposed at a lower side of the apparatus, and a fixing device 22, a paper discharge roller 23, and a paper discharge tray 24 are disposed at an upper side of the apparatus.

When an image is formed by the image creating systems 1Y, 1M, 1C, and 1K, the OPC drums 2Y, 2M, 2C, and 2K are rotatably driven by the drive source, which is not illustrated, the OPC drums 2Y, 2M, 2C, and 2K are uniformly charged by the charging rollers 3Y, 3M, 3C, and 3K, and optical writing is performed on the OPC drums 2Y, 2M, 2C, and 2K by the optical writing devices 8Y, 8M, 8C, and 8K based on image data of each color. Accordingly, an electrostatic latent image is formed on each of the OPC drums 2Y, 2M, 2C, and 2K.

The electrostatic latent images on the OPC drums 2Y, 2M, 2C, and 2K are developed by the developing devices 4Y, 4M, 4C, and 4K, respectively, and developed into a toner image of colors Y, M, C, and K. The transfer paper is supplied from the paper feed tray 21 in the horizontal direction by a paper feed roller 25, and is vertically conveyed in the direction of the image creating systems 1Y, 1M, 1C, and 1K by a conveyance system. The transfer paper is electro-statically adsorbed and held by the transfer belt 16, and is conveyed by the transfer belt 16. A full-color image is formed because a transfer bias is applied by a transfer bias applying unit, which is not illustrated, and toner images of colors Y, M, C, and K on the OPC drums 2Y, 2M, 2C, and 2K are sequentially superposed and transferred on the transfer paper. The transfer paper on which the full color image is formed is discharged to the paper discharge tray 24 by the paper discharge roller 23, after the full color image is fixed by the fixing device 22.

An electrical control device 26 controls the units in the color printer 100.

Figure 2:
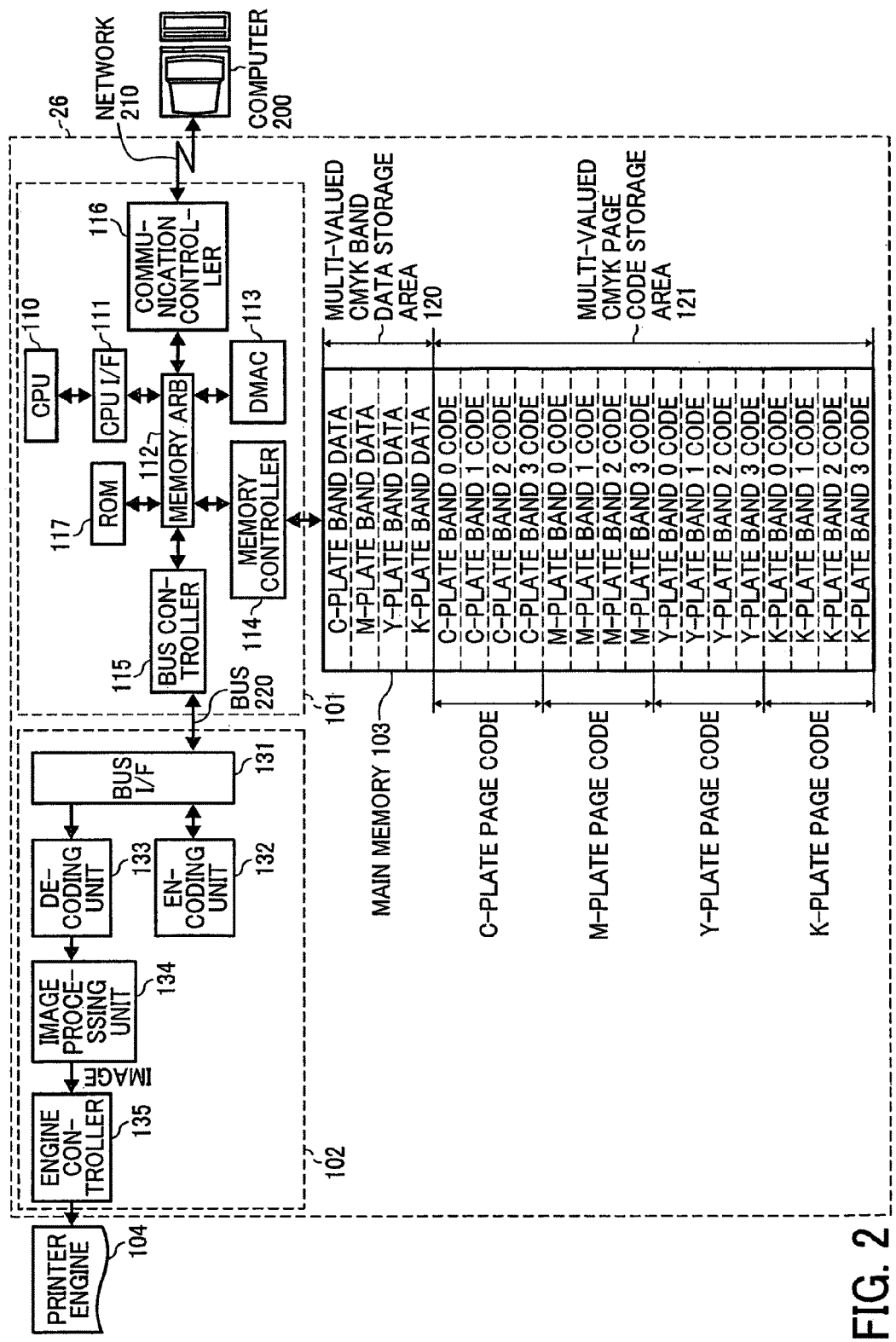
FIG. 2 is a schematic of an example of an electrical control device.

FIG. 2 is an example of the electrical control device 26. The electrical control device 26 includes a controlling unit 101, an image processing unit 102, and a main memory 103. The controlling unit 101 and the image processing unit 102 are connected through a bus 220. The controlling unit 101 includes a central processing unit (CPU) 110, a CPU interface (I/F) 111, a memory arbiter (ARB) 112, a Direct Memory Access Controller (DMAC) 113, a memory controller 114, a bus controller 115, and a communication controller 116.

In the controlling unit 101, the CPU 110 is connected to the memory arbiter 112 through the CPU I/F 111, and the main memory 103 is connected to the memory arbiter 112 through the memory controller 114. The memory controller 114 controls access to the main memory 103. The DMAC 113, the communication controller 116, and a read only memory (ROM) 117 are also connected to the memory arbiter 112. The memory arbiter 112 arbitrates access of the CPU 110, the DMAC 113, the communication controller 116, and the bus 220, to the main memory 103. The bus controller 115 that arbitrates access to the bus 220 is connected to the memory arbiter 112.

The CPU 110 accesses the ROM 117 through the CPU I/F 111 and the memory arbiter 112, reads out and executes a computer program stored in the ROM 117 in advance, and controls the entire operation performed by the color printer 100. In addition to various programs executed by the CPU 110, font information such as characters is stored in the ROM 117 in advance.

The communication controller 116 controls communication through a network 210. For example, page description language (PAL) data output from a computer 200 is received by the communication controller 116 through the network 210. The communication controller 116 transfers the received PDL data to the main memory 103, through the memory arbiter 112 and the memory controller 114.

The network 210 may be a network used for communicating within a predetermined area such as a local area network (LAN), a network capable of communicating in a wider area such as the Internet, or the like. The network 210 may be wired or wireless, or may be serial communication such as Universal Serial Bus (USB) and Institute Electrical and Electronics Engineers (IEEE) 1394.

The main memory 103 includes a multi-valued CMYK band data storage area 120 and a multi-valued CMYK page code storage area 121. Multi-valued band data of CMYK plates are stored in the multi-valued CMYK band data storage area 120. A page code obtained by encoding multi-valued band data of CMYK plates in a pixel unit is stored in the multi-valued CMYK page code storage area 121.

The main memory 103, which will be described later, further includes a PDL data storage area for storing page description language (PDL) data supplied from, for example, the computer 200.

For example, the CPU 110 performs drawing based on PDL data supplied from the computer 200, and generates multi-valued band data of CMYK plates. The generated multi-valued band data of CMYK plates is stored in the multi-valued CMYK band data storage area 120 of the main memory 103 through the memory arbiter 112.

The image processing unit 102, for example, is formed of an Application Specific Integrated Circuit (ASIC), and performs image processing on an image to be printed by printer engines of CMYK plates. The image processing unit 102 includes a bus I/F 131, an encoding unit 132, a decoding unit 133, an image processing unit 134, and an engine controller 135. The encoding unit 132 and the decoding unit 133 are connected to the bus I/F 131, and the bus I/F 131 arbitrates communication between the encoding unit 132 and the decoding unit 133 with the bus 220.

The encoding unit 132 encodes band data of plates transferred from the multi-valued CMYK band data storage area 120 of the main memory 103 through the bus 220 using prediction encoding, and generates one code string for each plate. The code strings generated by the encoding unit 132 are supplied to the main memory 103 from the bus I/F 131 through the bus 220, and are stored in the multi-valued CMYK page code storage area 121.

The code strings of one page stored in the multi-valued CMYK page code storage area 121 are read out from the multi-valued CMYK page code storage area 121, synchronizing with an operation performed by a printer engine 104, and are supplied to the image processing unit 102 through the bus 220. The code strings are supplied to the decoding unit 133 from the bus I/F 131 in the image processing unit 102. The decoding unit 133 decodes the supplied code strings, and supplies to the image processing unit 134. The image processing unit 134 applies image processing such as gradation processing on the supplied image data, and supplies to the engine controller 135. The engine controller 135 controls the printer engine 104 based on image data output from the image processing unit 134, and performs printing.

Example of Format of Main Memory

Figure 3:
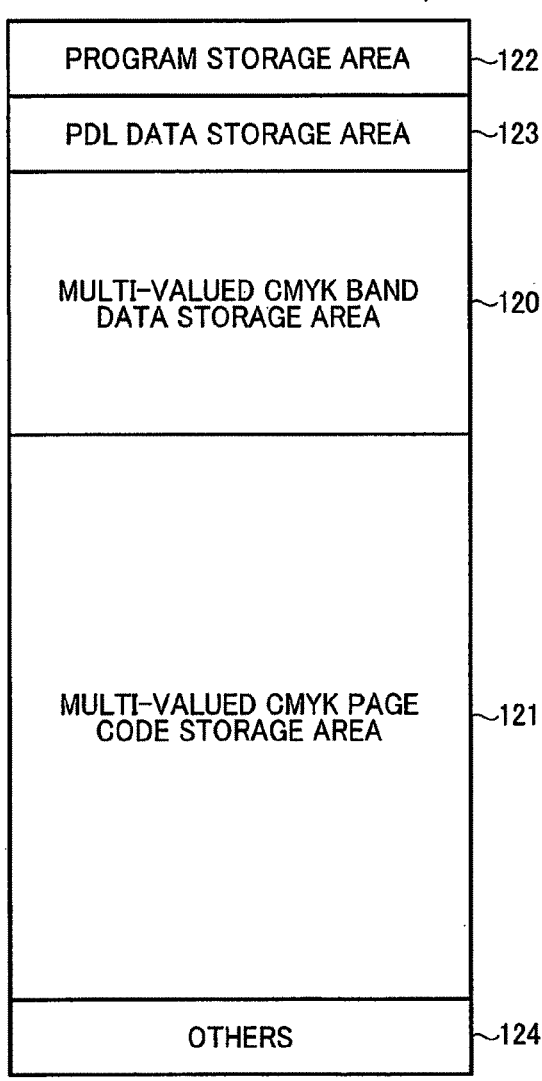
FIG. 3 is a schematic of a format of an example of a main memory.

FIG. 3 is a format of an example of the main memory 103. The main memory 103 includes a computer program storage area 122, a PDL data storage area 123, and another area 124, in addition to the multi-valued CMYK band data storage area 120 and the multi-valued CMYK page code storage area 121 described above. The computer program storage area 122 stores therein a computer program for causing the CPU 110 to operate. The PDL data storage area 123 stores therein PDL data supplied from, for example, the computer 200. The other area 124 stores therein data other than those described above.

Figure 4:
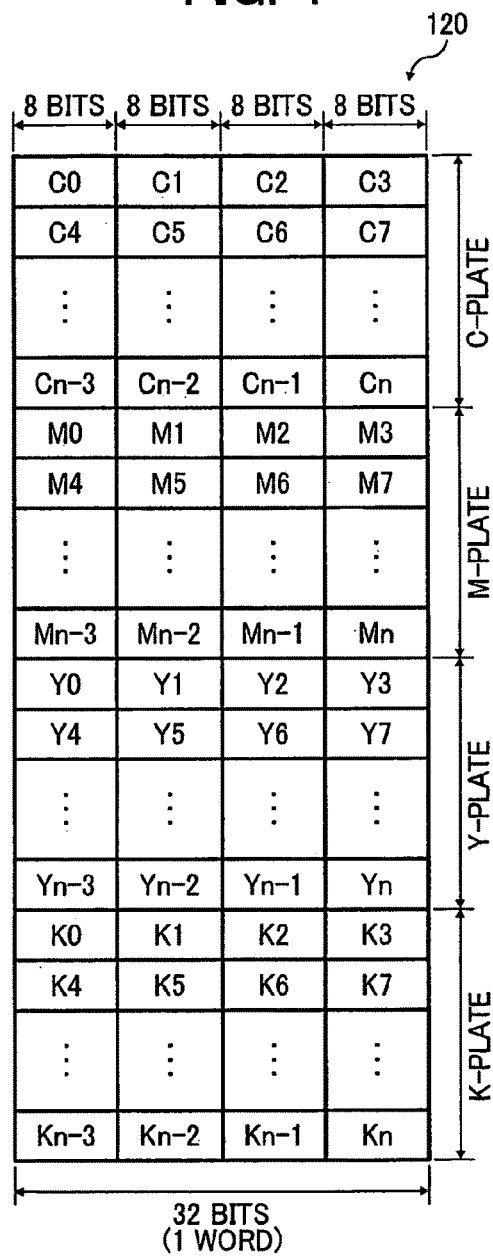
FIG. 4 is a schematic of a format of an example of a multi-valued CMYK band data storage area in the main memory.

FIG. 4 is a format of an example of the multi-valued CMYK band data storage area 120 in FIG. 3. In this manner, the multi-valued CMYK band data storage area 120 has a plane structure of a C-plate, an M-plate, a Y-plate, and a K-plate, and 8 bits are allocated for each pixel. In other words, the CMYK band data is a multi-valued plane image in which each pixel has a bit depth of 8 bits.

Figure 5:
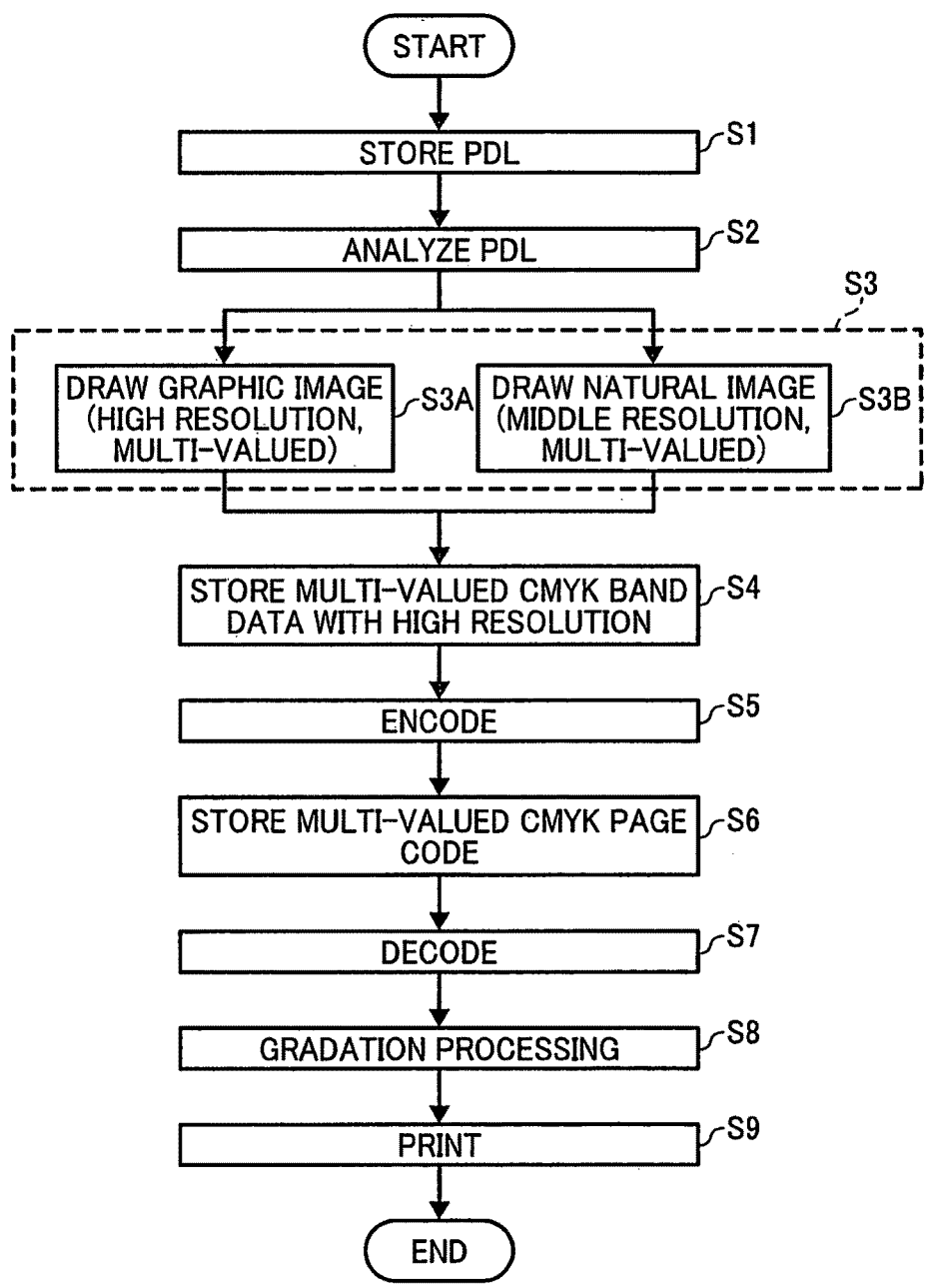
FIG. 5 is a schematic flowchart of an example of image processing performed in a color printer applicable to the present embodiment.

Outline of Image Processing in Printer:

FIG. 5 is a schematic flowchart of an example of image processing performed by the color printer 100 having the structure described above. By using the flowchart in FIG. 5, an operation performed by the color printer 100 is schematically described with reference to FIG. 2.

For example, PDL data generated by the computer 200 is received by the communication controller 116 through the network 210, and is stored in the PDL data storage area 123 of the main memory 103 (Step S1). The CPU 110 reads out the PDL data from the PDL data storage area 123 in the main memory 103, analyzes the PDL (Step S2), and draws a band image of CMYK based on the analysis result (Step S3).

In the present embodiment, drawing is performed separately on the band image at Step S3, that is, between an image in which high resolution is considered important such as a graphic image like text data and CG data, and an image in which gradation is considered more important than resolution such as a natural image like a photographic image and a pictorial image.

In other words, on receiving a drawing command of a graphic image from the PDL analysis processing performed at Step S2, the CPU 110 performs drawing on a graphic image at a high resolution (Step S3A). On receiving a drawing command of a natural image from the PDL analysis processing performed at Step S2, the CPU 110 performs drawing on an image obtained by converting a source image of the natural image, as will be described later (Step S3B). The details of drawing process performed at Step S3A and Step S3B will be described later.

In the following, it is assumed that a graphic image is drawn at a high resolution of 1200 dots per inch (dpi) and a source image of a natural image is drawn at a middle resolution of 600 dpi. The source image of the natural image is multi-valued image data having, for example, a bit depth of 8 bits. The source image is an original image before drawing is performed by a drawing command.

The CMYK band data of a CMYK band image drawn at Step S3 is stored in the multi-valued CMYK band data storage area 120 of the main memory 103 (Step S4). The CMYK band data, as described above, is multi-valued plane image data in which each pixel has a bit depth of 8 bits.

The encoding unit 132 reads out the CMYK band data from the multi-valued CMYK band data storage area 120 and encodes the CMYK band data by using a prediction encoding method such as a plane prediction method, a LOCO-I method, and a Paeth method (Step S5). The plane prediction method, the LOCO-I method, and the Paeth method will be described later. Code data obtained by encoding the CMYK band data is stored in the multi-valued CMYK page code storage area 121 of the main memory 103 (Step S6).

The decoding unit 133 reads out and decodes the code data obtained by encoding the CMYK band data from the multi-valued CMYK page code storage area 121, and supplies the decoded CMYK band data to the image processing unit 134 (Step S7). The image processing unit 134 performs image processing such as gradation processing on the CMYK band data supplied from the decoding unit 133 (Step S8). The CMYK band data on which image processing is performed is supplied to the printer engine 104 through the engine controller 135. The printer engine 104 performs printing based on the supplied CMYK band data (Step S9).

Example of Drawing Process in Embodiment

Figure 6:
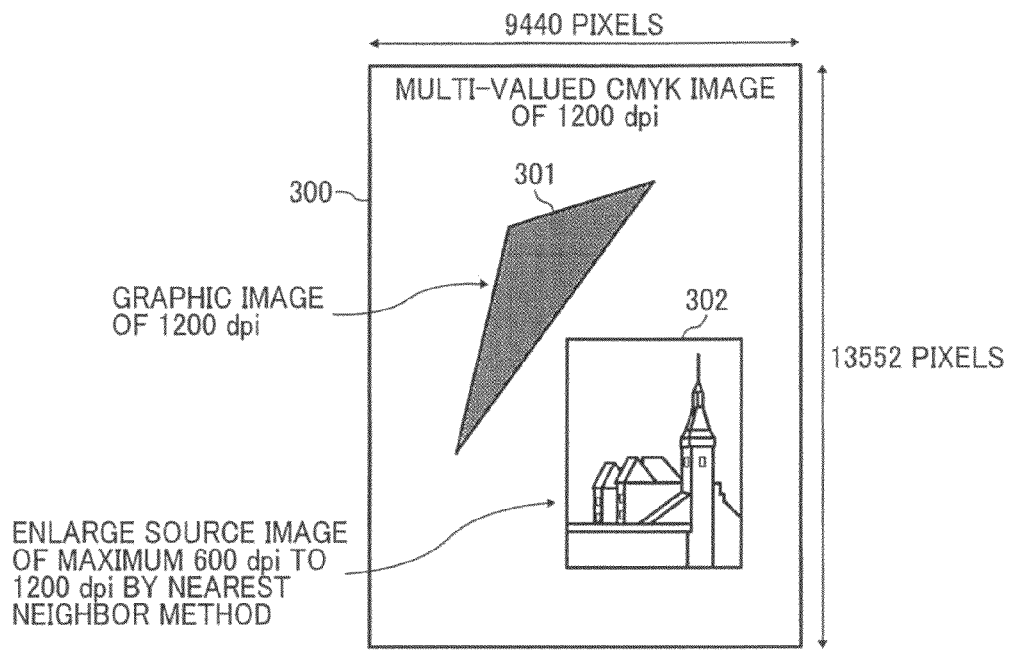
FIG. 6 is a schematic for explaining a drawing process in the present embodiment.

The CMYK drawing process performed at Step S3 described above will now be explained in more detail. For example, as illustrated in FIG. 6, consider when a multi-valued CMYK image formed of 9440 pixels×13552 pixels is drawn at a resolution of 1200 dpi. In this case, a graphic image 301 having a resolution of 1200 dpi can be drawn without change (Step S3A in FIG. 5). On the other hand, a natural image 302 (source image) having a resolution of 600 dpi is drawn at a resolution of 1200 dpi, by enlarging pixels of the image based on the magnification ratio, and interpolating by using copied pixels (Step S3B in FIG. 5).

A nearest neighbor method is a method for enlarging applicable to enlarge the natural image at Step S3B. For example, to enlarge an image, the nearest neighbor method is an interpolation method in which interpolation during enlargement is performed by using a pixel having the same pixel value with that of a pixel placed nearest to the interpolation position.

In the following, an image in which resolution of a source image is converted for drawing is referred tows a drawing image.

Figure 7:
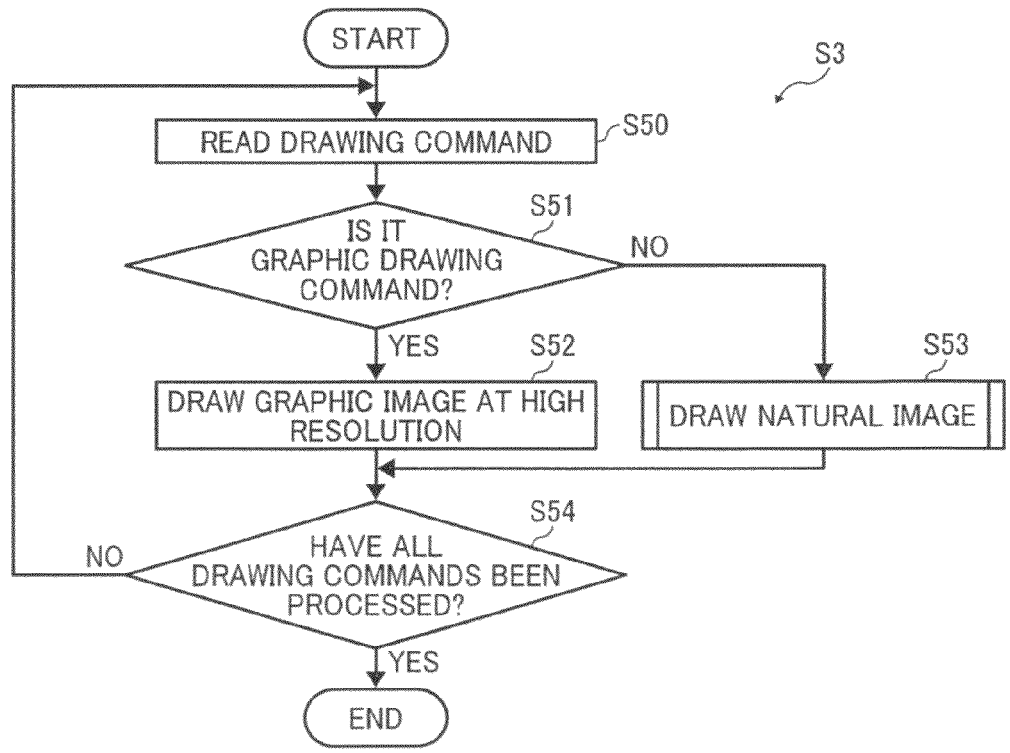
FIG. 7 is a flowchart of an example of the drawing process in the present embodiment described in more detail.

FIG. 7 is a flowchart of the example of drawing process at Step S3 explained in the flowchart in FIG. 5 described in more detail. The CPU 110 reads out the drawing command obtained by analyzing the PDL data at Step S2 in FIG. 5 (Step S50), and determines whether the read drawing command is a graphic drawing command for drawing a graphic image (Step S51). If the drawing command is a graphic drawing command, the process proceeds to Step S52 where a graphic image is drawn at a high resolution (such as 1200 dpi).

If the drawing command is not a graphic drawing command, in other words, if the drawing command is a natural image drawing command for drawing a natural image at Step S51, the process proceeds to Step S53 where a natural image is drawn by using a process, which will be described later.

If the process performed at Step S52 or Step S53 is finished, the process proceeds to Step S54 where whether all drawing commands in one page have been processed is determined. If all the drawing commands are not yet processed, the process proceeds to Step S50 where the next drawing command is read, and a process relative to the next drawing command is performed. If all the drawing commands are processed at Step S54, the process at Step S3 in FIG. 5 is skipped, and the process proceeds to Step S4 in FIG. 5.

Figure 8:
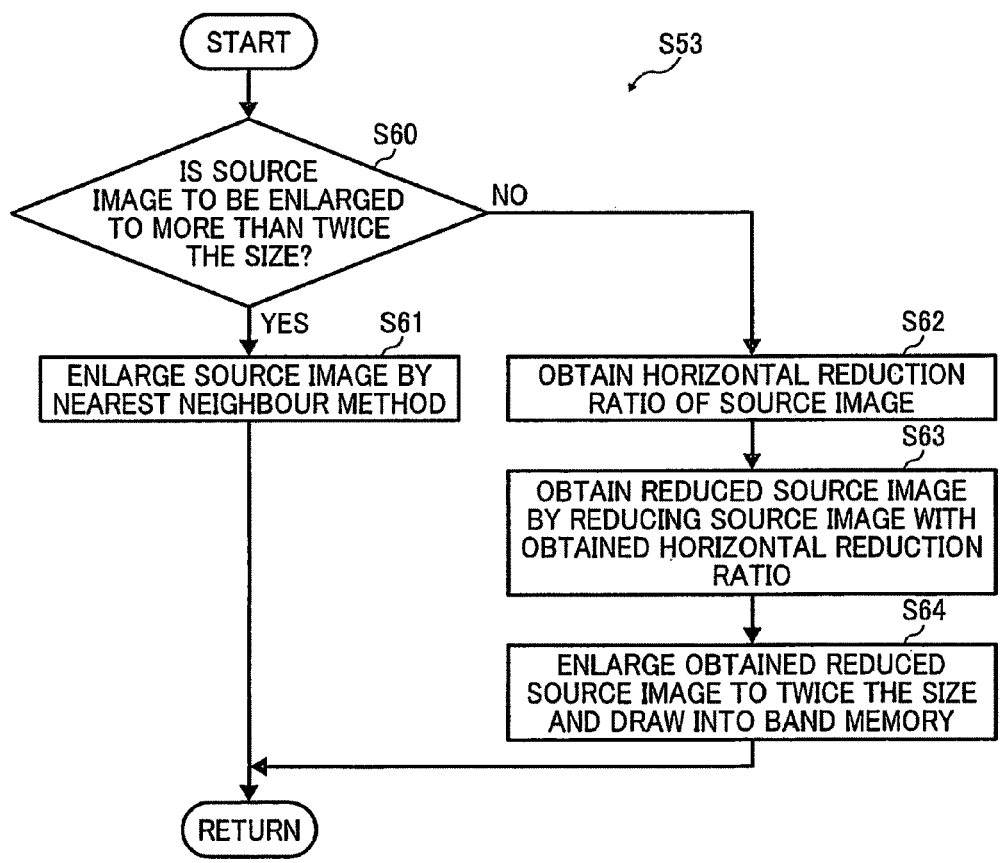
FIG. 8 is a flowchart of an example of drawing process of a natural image in the present embodiment described in more detail.

FIG. 8 is a flowchart of the example of the drawing process of the natural image performed at Step S53 in FIG. 7 described in more detail. If the drawing command is not the graphic drawing command at Step S51 in FIG. 7, the process proceeds to Step S60 in FIG. 8. At Step S60, whether the drawing command is a command to enlarge the source image to equal to or more than twice the size is determined.

If at Step S60 the drawing command is to enlarge the source image to equal to or more than twice the size, the process proceeds to Step S61 where the source image is enlarged corresponding to the enlargement ratio of the drawing command, using the nearest neighbor method. In other words, in this case, based on the nearest neighbor method, pixels of a source image are copied as much as an amount corresponding to the magnification ratio, and insert the pixels beside the original pixels. As a practical process, a source image may be enlarged, for example, by copying rows and columns of pixels of a source image as much as an amount corresponding to the magnification ratio, and sequentially inserting the copied rows and columns beside the original rows and columns.

Figure 9:
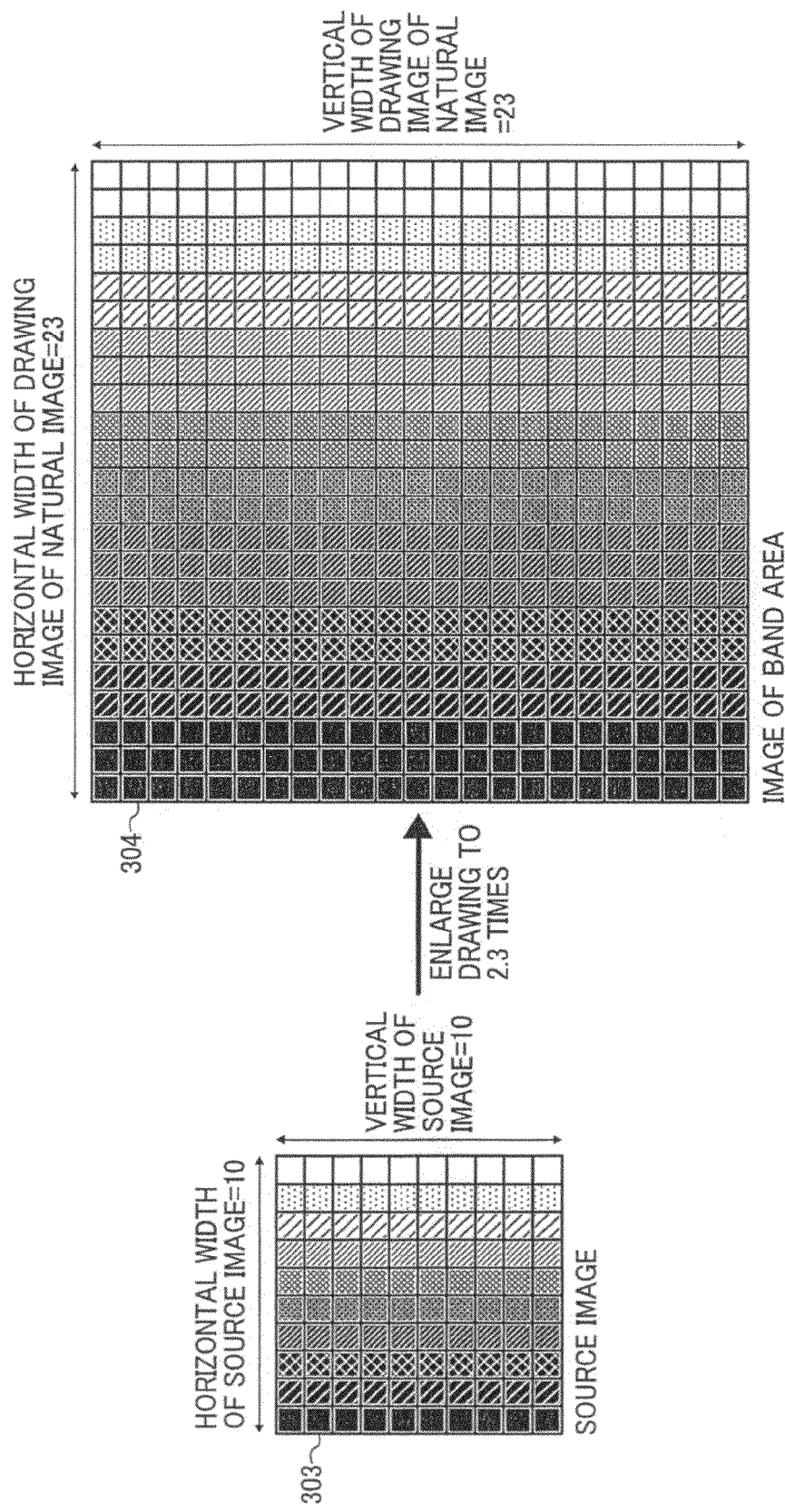
FIG. 9 is a schematic of an example when a drawing is enlarged to equal to or more than twice the size in the present embodiment described in more detail.

FIG. 9 is an example when the drawing is enlarged to equal to or more than twice the size at Step S61 described in more detail. In the example in FIG. 9, a source image having a horizontal width and a vertical width of both ten pixels is enlarged at a magnification ratio of 2.3 times, and is converted into a drawing image having a horizontal width and a vertical width of both 23 pixels. In this case, any three rows and three columns of the source image formed of 10 pixels×10 pixels are copied by two, and the remaining seven rows and seven columns are only copied by one. Accordingly, a drawing image of 23 pixels and 23 pixels that is the source image enlarged to 2.3 times the size is obtained. In this case, the drawing image is formed of seven sets of continuous two rows and two columns with equal pixel values and three sets of continuous three rows and three columns with equal pixel values. The drawing image is written into the multi-valued CMYK band data storage area 120.

At Step S60, if the drawing command is not a command to enlarge the drawing to equal to or more than twice the size, the process proceeds to Step S62. At Step S62 and thereafter, a source image is temporarily reduced to 1/2 times relative to a specified magnification ratio, and then enlarged to twice the size by using the nearest neighbor method. Accordingly, a drawing image of the specified magnification ratio is obtained.

At Step S62, a horizontal reduction ratio used to reduce a source image based on a specified magnification ratio is calculated. Formula (1) calculates a horizontal width $H_S$ of the reduced source image.

$$H_S = \text{horizontal width of drawing image} \times 1/2 \quad (1)$$

Formula (2) calculates a horizontal reduction ratio from the horizontal width $H_S$ of the reduced source image being obtained. In formula (2), a horizontal width $H_{ORG}$ is a horizontal width of a source image before being reduced.

$$\text{Horizontal reduction ratio} = H_S/H_{ORG} \quad (2)$$

At Step S63, the source image is reduced by the horizontal reduction ratio calculated at Step S62, thereby generating a reduced source image. At the next Step S64, the reduced source image is enlarged to twice the size using the nearest neighbor method, thereby generating a drawing image. The generated drawing image is stored in the multi-valued CMYK band data storage area 120.

Figure 10A:
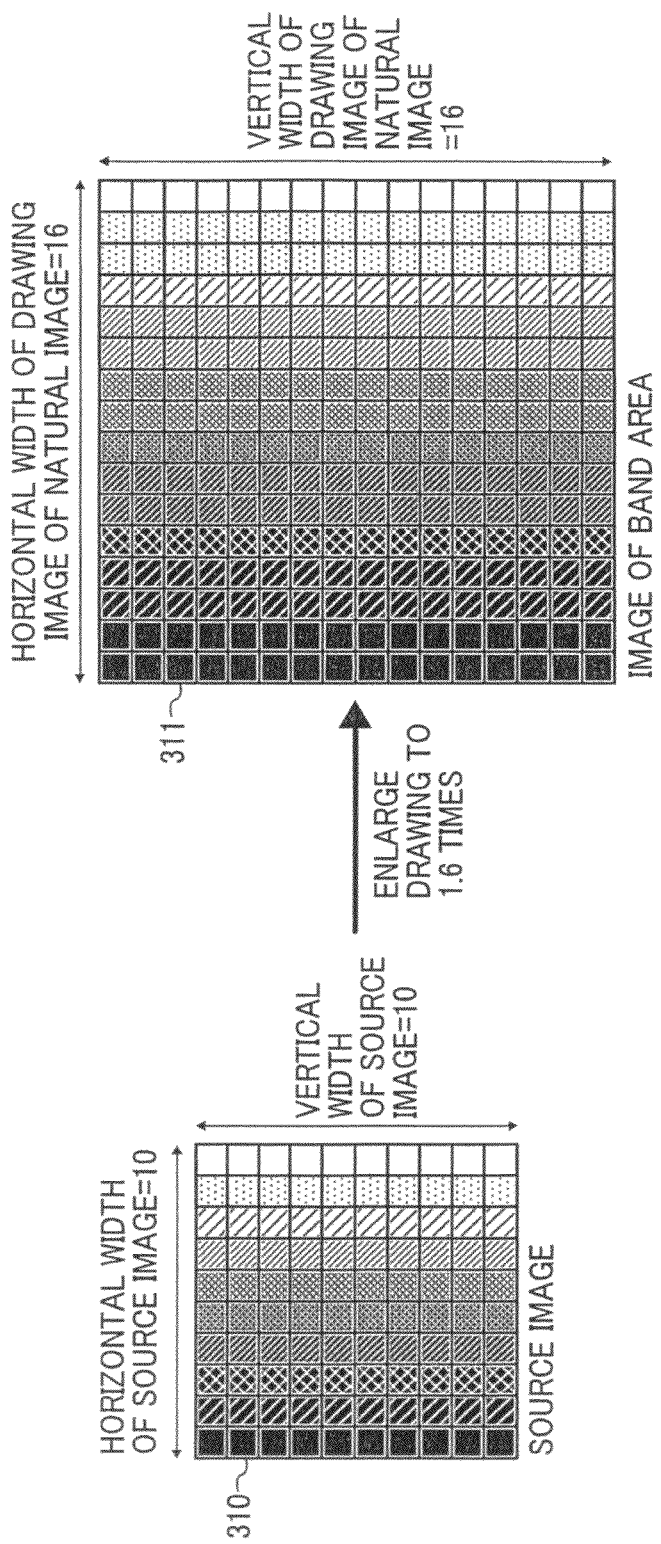
FIG. 10A is a schematic of an example when a source image is enlarged by a factor of equal to or less than two and equal to or more than one, without using a method in the present embodiment.
Figure 10B:
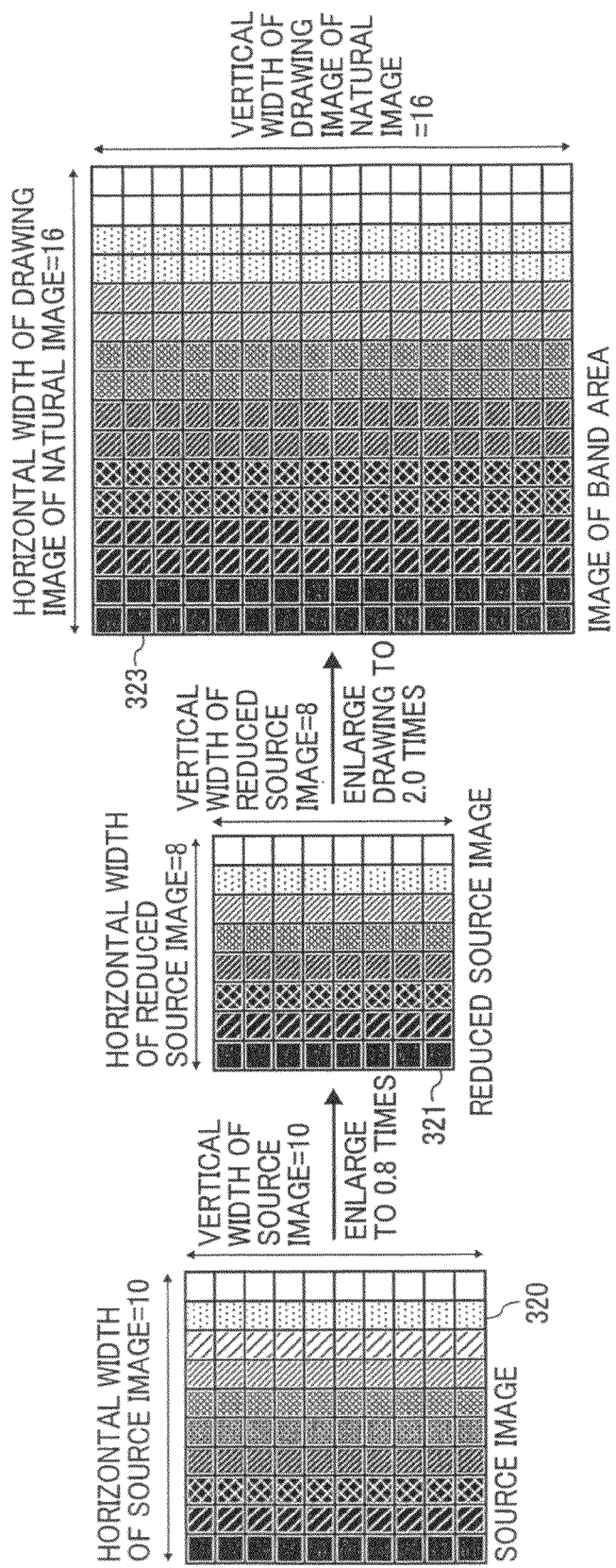
FIG. 10B is a schematic of an example when a source image is enlarged by a factor of equal to or less than two and equal to or more than one, by using the method in the present embodiment.

With reference to FIGS. 10A and 10B and FIGS. 11A and 11B, the processes at Steps S62 to S64 are described in more detail. In FIGS. 10A and 10B, a source image is enlarged by a factor of less than two and equal to or more than one. In the example, a source image of 10 pixels×10 pixels is enlarged at a magnification ratio of 1.6 times, thereby obtaining a drawing image of 16 pixels×16 pixels.

FIG. 10A is an example when the method of the present embodiment is not used. In this case, for example, any six rows and six columns in the pixels of ten rows and ten columns of a source image 310 are copied by one, and the remaining four rows and four columns are used singularly without copying them. Accordingly, a drawing image 311 enlarged at a magnification ratio of 1.6 times can be obtained. In this case, if the source image 310 is a natural image, a large number of pixels in which pixel values do not match with those of the adjacent pixels may be present. With such pixels, it is highly probable that prediction obtained by performing prediction process may not be correct. Accordingly, compression ratio may be reduced by prediction encoding.

FIG. 10B is an example when the method of the present embodiment is used. At Step S62 described above, horizontal width $H_S$ of a source image 320 after being reduced is calculated based on formula (1). Because the size of a drawing image, in other words, an image obtained by enlarging the source image 320 is 16 pixels×16 pixels, formula (1) is given as follows:

$$H_S = 16 \times 1/2 = 8 \text{ (pixels)}$$

Based on formula (2), a horizontal reduction ratio is calculated from the horizontal width $H_S$ of a reduced source image 321. Because the horizontal width of the source image 320 is ten pixels, formula (2) is given as follows:

$$\text{Horizontal reduction ratio} = 8/10 = 0.8$$

Based on Step S63 described above, the source image 320 is reduced by the calculated horizontal reduction ratio. For example, the source image is reduced by thinning out pixels of the source image 320 from the rows and columns corresponding to the horizontal reduction ratio, thereby generating the reduced source image 321. Based on Step S64 described above, the reduced source image 321 is enlarged to twice the size using the nearest neighbor method, thereby generating a drawing image 323 of 16 pixels×16 pixels. In this case, the drawing image 323 is an image in which all the rows and columns of the reduced source image 321 are copied by one, and are continuously inserted relative to the original rows and columns. In this case, even if the source image 320 is a natural image, pixel values of at least every two adjacent pixels are equal to each other. Accordingly, it is possible to obtain a high compression ratio by prediction encoding.

Figure 11A:
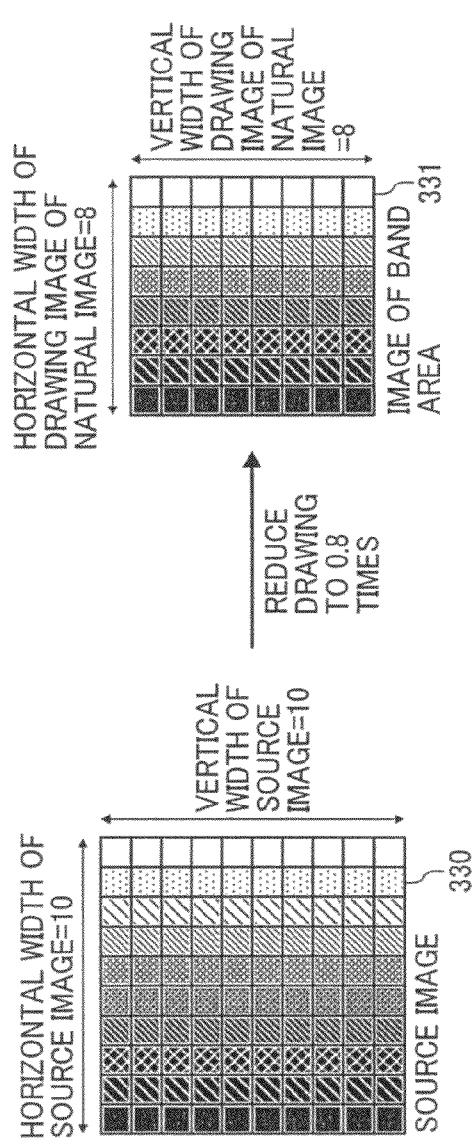
FIG. 11A is a schematic of an example when a source image is enlarged by a factor of equal to or less than one, without using the method in the present embodiment.
Figure 11B:
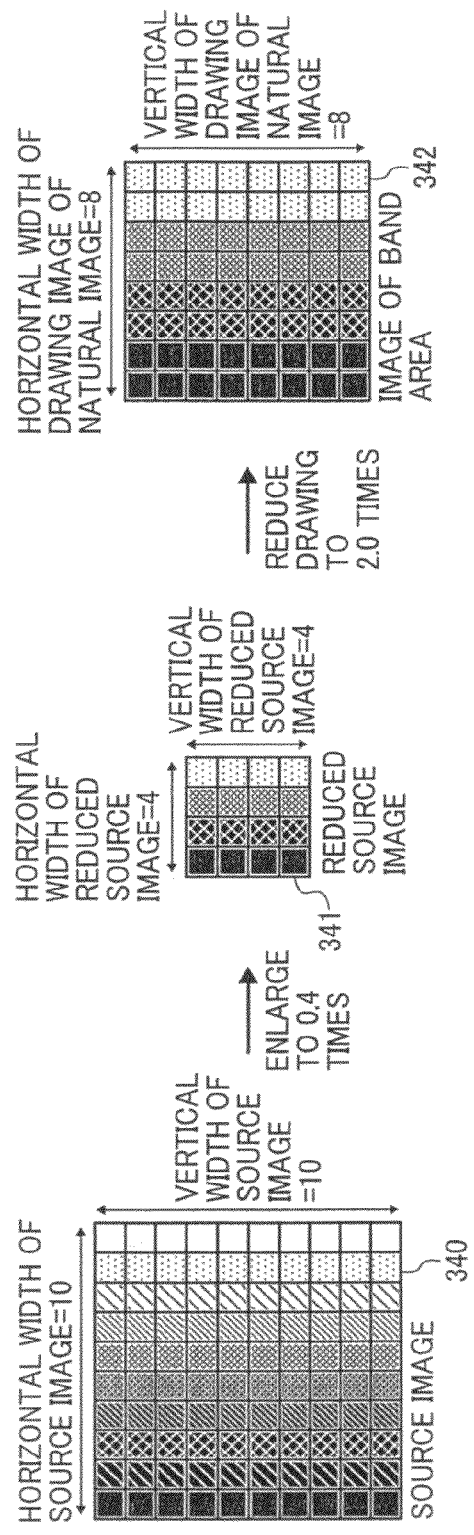
FIG. 11B is a schematic of an example when a source image is enlarged by a factor of equal to or less than one, by using the method in the present embodiment.

FIGS. 11A and 11B are examples, when a source image is reduced, in other words, enlarged with the magnification ratio equal to or less than one. In these examples, a source image of 10 pixels×10 pixels is reduced to 0.8 times, thereby obtaining a drawing image of 8 pixels×8 pixels.

FIG. 11A is an example when the method of the present embodiment is not used. In this case, for example, a drawing image 331 of 8 pixels×8 pixels is obtained by thinning out any two rows and two columns from the pixels of a source image 330 of 10 rows and 10 columns. By using this method, the pixel values of the rows and columns of the drawing image 331 may all be different. Accordingly, compression ratio may be reduced by prediction encoding.

FIG. 11B is an example when the method of the present embodiment is used. At Step S62 described above, a horizontal width $H_S$ of the reduced source image is calculated based on formula (1). Because the size of a drawing image, in other words, an image obtained by enlarging (reducing) a source image 340 is 8 pixels×8 pixels, formula (1) is given as follows:

$$H_S = 8 \times 1/2 = 4 \text{ (pixels)}$$

Based on formula (2), a horizontal reduction ratio is calculated from the horizontal width $H_S$ of the reduced source image. Because the horizontal width of the source image is 10 pixels, formula (2) is given as follows:

$$\text{Horizontal reduction ratio} = 4/10 = 0.4$$

Based on Step S63 described above, the source image is reduced by the calculated horizontal reduction ratio. For example, the source image is reduced by thinning out pixels of the rows and columns of the source image corresponding to the horizontal reduction ratio. Accordingly, a reduced source image 341 is generated. Based on Step S64 described above, the reduced source image 341 is enlarged to twice the size by using the nearest neighbor method. Accordingly, a drawing image 342 of 8 pixels×8 pixels is generated. In this case, a drawing image 342 is an image in which all the rows and columns of the reduced source image 341 are copied by one and are continuously inserted into the original rows and columns.

In this example also, similar to when the magnification ratio of equal to or less than two and equal to or more than one described with reference to FIG. 10B is used, pixel values of at least every two adjacent pixels are equal to each other in the drawing image 342. Accordingly, it is possible to obtain a high compression ratio by prediction encoding.

A graphic image is drawn at a resolution of 1200 dpi and a natural image is drawn at a resolution of 600 dpi. Because the resolutions are different from each other, when the graphic image and the natural image are combined into one image data, a gap may occur between the graphic image and the natural image. For example, consider when a coordinate of a natural image drawn at a resolution of 600 dpi in buffer is made to correspond with a coordinate of a graphic image drawn at a resolution of 1200 dpi in buffer. In this case, the coordinate of the natural image is set to a two pixel unit relative to the coordinate of the graphic image, and depending on the shape of the image, a gap may occur between the images.

In the present embodiment, a drawing image obtained by enlarging or reducing a source image by using the method, of the present embodiment is written into the multi-valued CMYK band data storage area 120, using an address based on the resolution of the graphic image having resolution higher than that of the source image.

Figure 12:
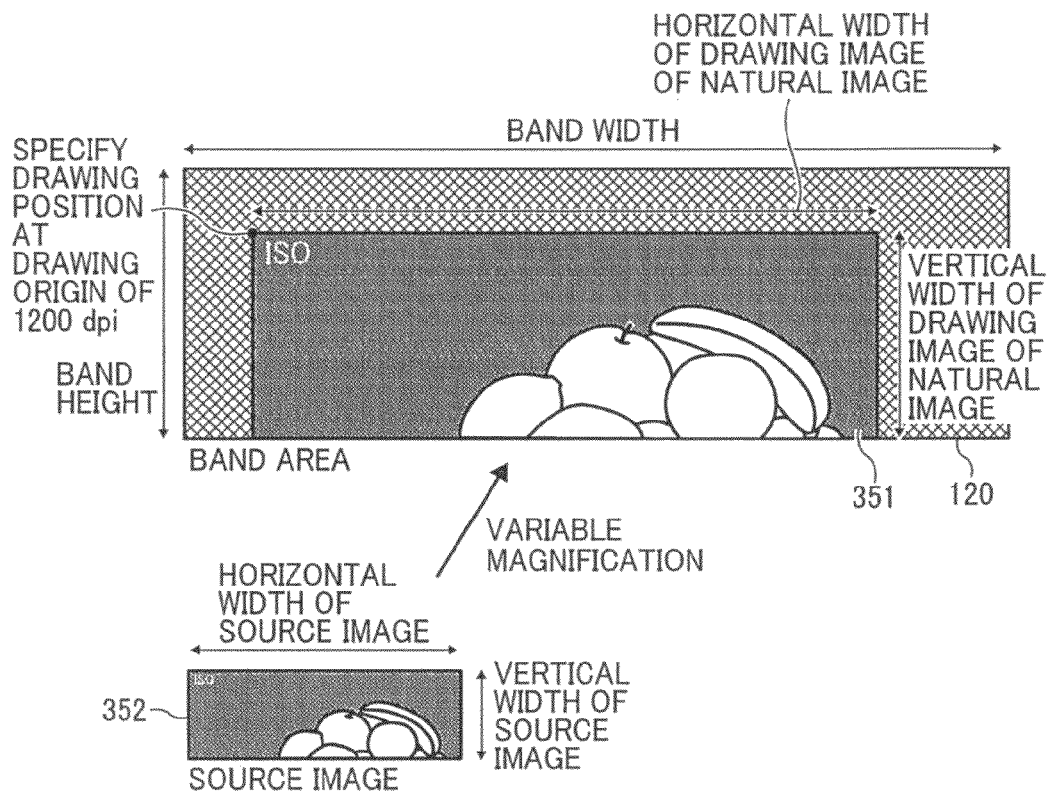
FIG. 12 is a schematic for explaining an address used to write a drawing image into the multi-valued CMYK band data storage area.

As an example, as illustrated in FIG. 12, consider when a drawing image 351 is generated by enlarging a source image 352 having a resolution of 600 dpi at a magnification ratio of equal to or more than two by using the nearest neighbor method. In this case, the generated drawing image 351 is written into a specified drawing position of the multi-valued CMYK band data storage area 120, at 1200 dpi that is the resolution for drawing the graphic image. By specifying the drawing position of the drawing image in this manner, even if the graphic image and the natural image are adjacent or overlapped with each other, a gap does not occur between the graphic image and the natural image.

Figure 13:
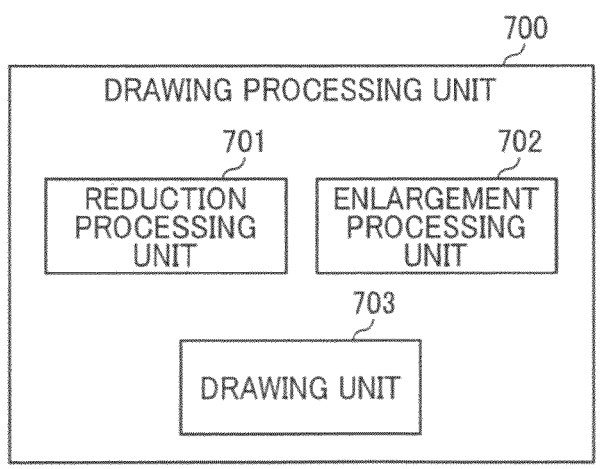
FIG. 13 is a functional schematic of an example of a drawing processing unit that executes a drawing process function in the present embodiment.

The drawing process performed in the present embodiment as described above, for example, is executed by a drawing process function that is one of functions performed by the CPU 110. FIG. 13 is a functional schematic of an example of a drawing processing unit 700 that executes the drawing process function. The drawing processing unit 700 includes a reduction processing unit 701, an enlargement processing unit 702, and a drawing unit 703. The units of the drawing processing unit 700 are performed by causing the CPU 110 to execute a computer program stored in the ROM 117 and the computer program storage area 122 of the main memory 103.

The reduction processing unit 701, as described above, generates a reduced source image by reducing a source image corresponding to the specified magnification ratio. The enlargement processing unit 702, as described above, generates a drawing image by enlarging a source image or a reduced source image corresponding to the specified magnification ratio. The drawing unit 703 draws the generated drawing image into the multi-valued CMYK band data storage area 120.

Figure 14:
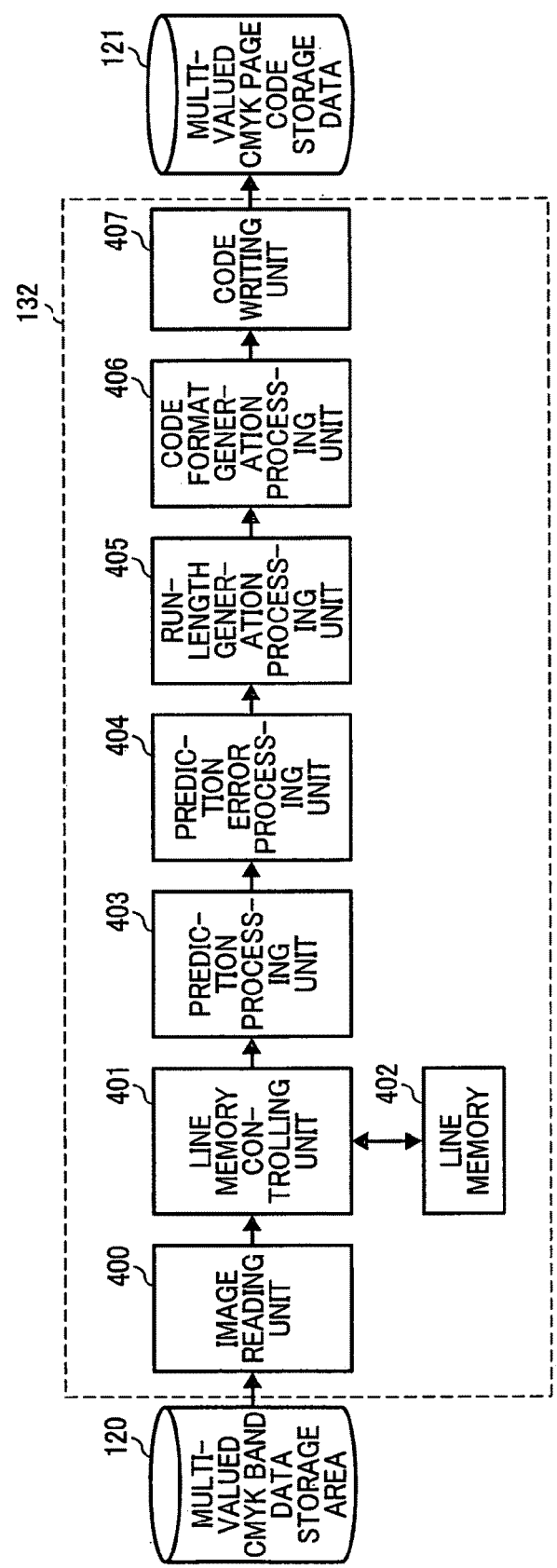
FIG. 14 is a schematic of an example of an encoding unit in the present embodiment.
Figure 15:
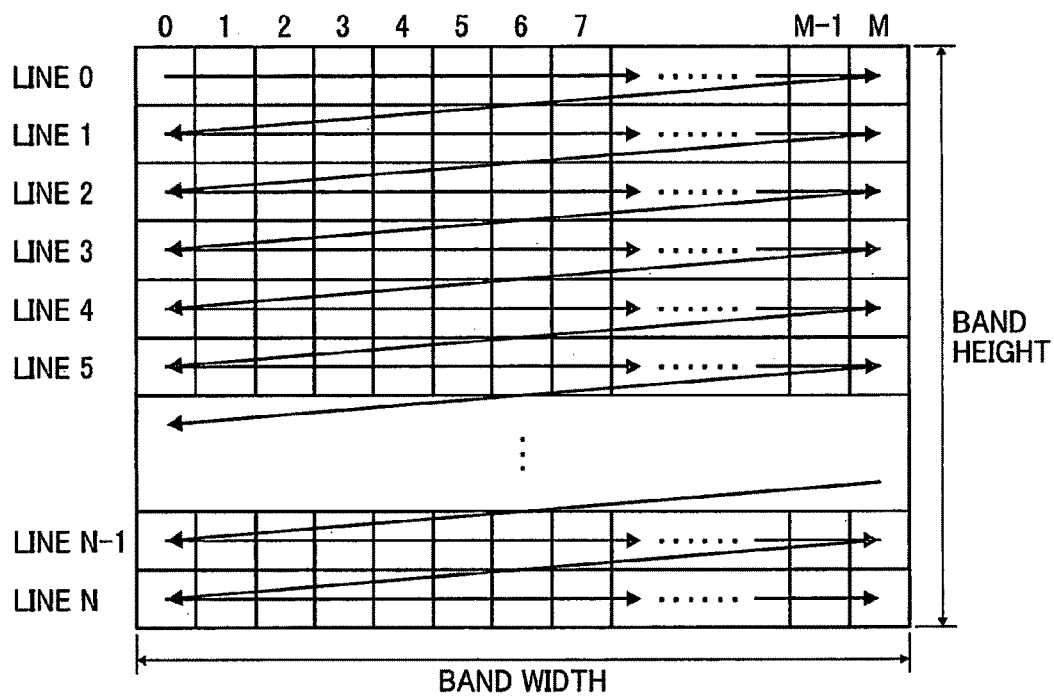
FIG. 15 is a schematic for explaining a read-out order of CMYK band data from the multi-valued CMYK band data storage area.

Outline of Encoding Process:

The prediction encoding process performed at Step S5 described above will now be explained in more detail. FIG. 14 is a schematic of an example of the encoding unit 132 in the present embodiment. In the encoding unit 132, multi-valued CMYK band data of CMYK plates are read out from the multi-valued-CMYK band data storage area 120 in the main memory 103, by an image reading unit 400. At this time, the multi-valued CMYK band data of CMYK plates, as illustrated in FIG. 15, are sequentially read out from the multi-valued CMYK band data storage area 120 in a pixel unit for every scan line, by the image reading unit 400.

In a line memory controlling unit 401, the multi-valued CMYK band data read out by the image reading unit 400 in a pixel unit is stored in a line memory 402 by the line memory controlling unit 401. The line memory 402 can store therein the multi-valued CMYK band data at least two lines. The line memory 402 is controlled by the line memory controlling unit 401 so as to store therein data supplied at this time, and to hold data for one line stored, therein immediately before.

For example, the line memory 402 has a first area and a second area capable of storing therein pixels of one line, respectively. When encoding of pixel data of one line is finished, the line memory 402 holds image data of an area where the encoding has finished, and is controlled so as to write pixel data of the next line into the other area.

Figure 16:
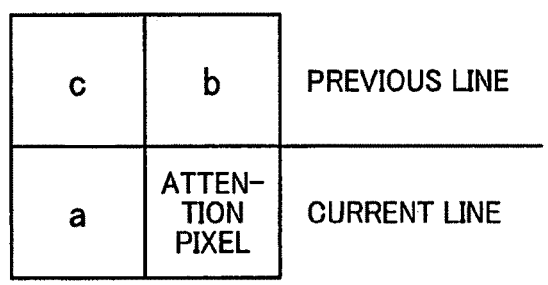
FIG. 16 is a schematic for explaining a pixel used in a prediction process.

The line memory controlling unit 401 controls pixel data of a pixel to be encoded (hereinafter, referred to as attention pixel) and pixel data of three pixels surrounding the attention pixel to be read from the line memory 402. The pixel data are then delivered to a prediction processing unit 403. The three surrounding pixels read out from the line memory 402 are pixels placed adjacent to the attention pixel and with which encoding is already finished. More specifically, as illustrated in FIG. 16, the three surrounding pixels are a pixel a immediately before the attention pixel in the scanning order, a pixel b placed directly above the attention pixel, in a previous line placed immediately before the current line of the attention pixel in the scanning order, in other words, directly above the attention pixel in a line directly above the line of the attention pixel, and a pixel c immediately before the pixel b in the scanning order.

A line of the attention pixel that is to be encoded is referred to as a current line, and a line immediately before the current line in the scanning order is referred to as a previous line.

The prediction processing unit 403 predicts a pixel value of an attention pixel, based on the pixel a, the pixel b, and the pixel c, delivered from the line memory controlling unit 401. In the present embodiment, in the prediction processing unit 403, a pixel value of an attention pixel is predicted by using the plane prediction method, the Low Complexity Lossless Compression for Images (LOCO-I) method, or the Paeth method, which will be described later. The plane prediction method can predict a pixel value of an attention pixel by using an extremely simple method. The LOCO-I method or the Paeth method can obtain a prediction value with high accuracy compared with that of the plane prediction method. A pixel value of an attention pixel and a prediction value obtained by predicting a pixel value of the attention pixel by the prediction processing unit 403 are delivered to a prediction error processing unit 404.

If an attention pixel is an initial pixel of the line in the scanning order, and if the current line is the initial line in the scanning order, a plane prediction value is considered as 0.

The prediction error processing unit 404 calculates a prediction error value, that is a difference between a pixel vale of an attention pixel and a plane prediction value calculated by the prediction processing unit 403. A run-length generation processing unit 405, if a prediction error value calculated by the prediction error processing unit 404 is "0", increases a run-length value by only one. If the prediction error value is not "0", the run-length processing unit 405 delivers the prediction error value, the run-length value, and the pixel value of the attention pixel to a code format generation processing unit 406, then resets the run-length value.

The code format generation processing unit 406 encodes the run-length value delivered from the run-length generation processing unit 405 and the prediction error value based on code formats, which will be described later. As will be described later, if the prediction error value is placed out of a range capable of being expressed by a difference code, the pixel value of the attention pixel is used without change as the code. The code generated by the code format generation processing unit 406 is delivered to a code writing unit 407 and written into the page code storage area 121 of the main memory 103.

Example of Prediction Process

A prediction process performed by the prediction processing unit 403 will now be described. As described above, in the present embodiment, the plane prediction method, the LOCO-I method, or the Paeth method is used for a prediction process for predicting a pixel value of an attention pixel from the pixel values of the encoded pixels a, b, and c.

Figure 17:
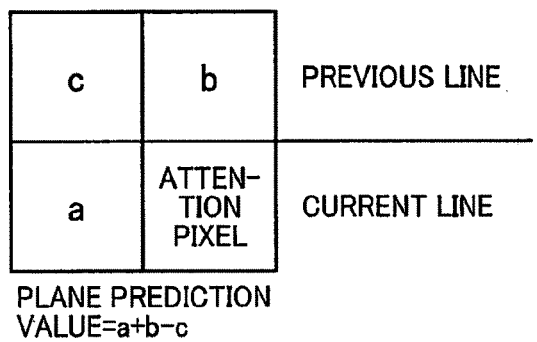
FIG. 17 is a schematic for explaining a plane prediction method.

The plane prediction method will now be described. In the plane prediction method, as illustrated in FIG. 17, a prediction value relative to an attention pixel is calculated by the following formula (3), by using the pixel a encoded immediately before the attention pixel in the current line, and the pixels b and c placed directly above and adjacent to the attention pixel and the pixel a in the previous line.

$$\text{Prediction value} = a + b - c \qquad (3)$$

Figure 18:
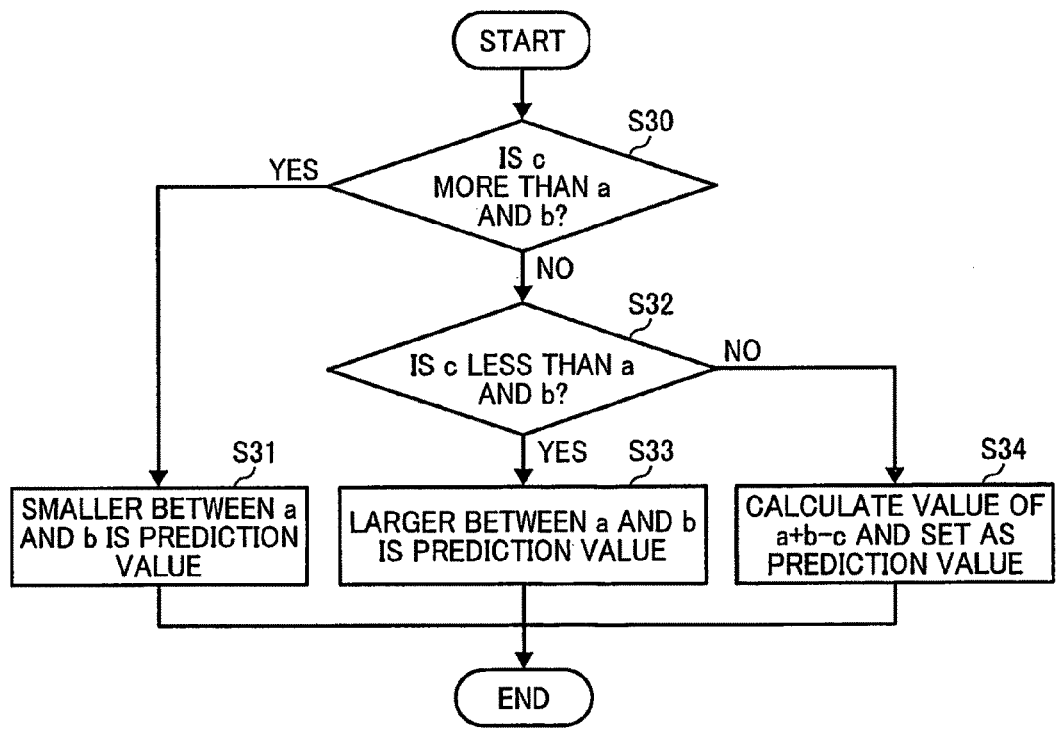
FIG. 18 is a flowchart of an example of a prediction process performed by a LOCO-I method.

The LOCO-I method will now be described. In the LOCO-I method, a calculation method of a prediction value is switched based on the result obtained by comparing a pixel value of the pixel c with pixel values of the pixel a and the pixel b. FIG. 18 is a flowchart of an example of a prediction process performed by the LOCO-I method. At Step S30, whether the pixel value of the pixel c is equal to or more than the pixel value of the pixel a, and whether the pixel value of the pixel c is equal to or more than the pixel value of the pixel b are determined. If the pixel value of the pixel c satisfies the conditions, the process proceeds to Step S31 where the pixel value of the pixel a and the pixel value of the pixel b are compared, and a smaller pixel value is set as a prediction value.

At Step S30, if the pixel value of the pixel c does not satisfy the conditions above, in other words, if the pixel value of the pixel c is less than the pixel value of the pixel a, or if the pixel value of the pixel c is less than the pixel value of the pixel b, the process proceeds to Step S32. At Step S32, whether the pixel value of the pixel c is equal to or less than the pixel value of the pixel a, and whether the pixel value of the pixel c is equal to or less than the pixel value of the pixel b are determined. If the pixel value of the pixel c satisfies the conditions, the process proceeds to Step S33 where the pixel value of the pixel a and the pixel value of the pixel b are compared, and the larger pixel value is set as a prediction value.

At Step S32, if the pixel value of the pixel c does not satisfy the conditions described above, in other words, if the pixel value of the pixel c exceeds the pixel value of the pixel a, or the pixel value of the pixel c exceeds the pixel value of the pixel b, the process proceeds to Step S34. That is, either one of the pixel values between the pixel a and the pixel b exceeds the pixel value of the pixel c, and the other pixel value is less than the pixel value of the pixel c. At Step S34, formula (3) described above is calculated from the pixels a, b, and c, and the obtained value is set as a prediction value.

Figure 19:
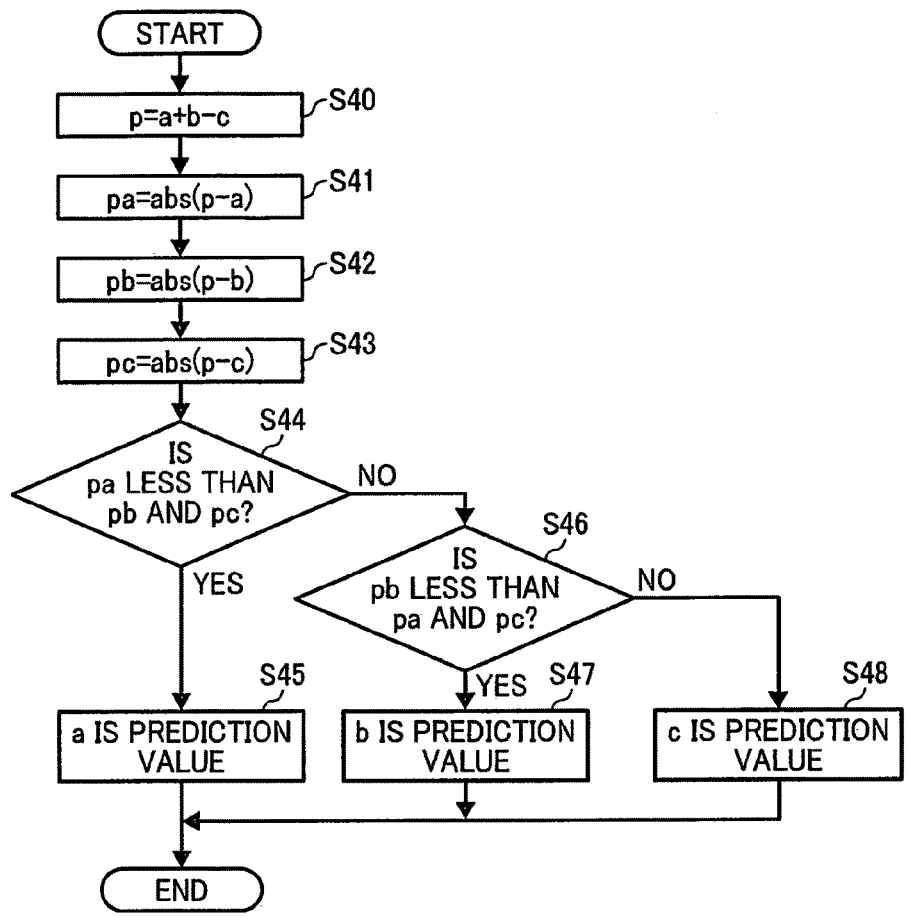
FIG. 19 is a flowchart of an example of a prediction process performed by a Paeth method.

The Paeth method will now be described. FIG. 19 is a flowchart of an example of a prediction process performed by the Paeth method. In the Paeth method, simple linear functions of the pixels a, b, and c are calculated, and a value of the pixels a, b, and c closest to the calculated value is selected as a prediction value. More specifically, a value p is calculated by the formula (3) described above, and difference absolute values pa, pb, and pc between the calculated value p and pixel values of the pixels a, b, and c are calculated. Based on the comparative size of the calculated difference absolute values pa, pb, and pc, prediction value is selected from the pixels a, b, and c.

At Step S40, the value p is calculated from the pixel values of the pixels a, b, and c, using the formula (3) described above. At Steps S41, S42, and S43, difference absolute values pa, pb, and pc between the value p and the pixel values of the pixels a, b, and c are calculated.

In FIG. 19, an operator abs is to calculate an absolute value of values in parentheses. In the following, to avoid complication, the difference absolute values pa, pb, and pc are referred to as values pa, pb, and pc, respectively.

If the values pa, pb, and pc are calculated by the processes up to Step S43, the process proceeds to Step S44. At Step S44, the values pa, pb, and pc are compared, and whether the value pa is equal to or less than the value pb, and whether the value pa is equal to or less than the value pc are determined. If the value pa satisfies the conditions, the process proceeds to Step S45 where a pixel value of the pixel a is set as a prediction value.

If at Step S44 the value pa is equal to or less than the value pb, and the value pa is not equal to or less than the value pc, in other words, if the value pa exceeds the value pb, or if the value pa exceeds the value pc, the process proceeds to Step S46. At Step S46, the value pb, and the values pa and pc are compared, and whether the value pb is equal to or less than the value pa and whether the value pb is equal to or less than the value pc are determined. If the value pb satisfies the conditions, the process proceeds to Step S47 where the pixel value of the pixel b is set as a prediction value.

If at Step S46 the value pb is equal to or less than the value pa and the value pb is not equal to or less than the value pc, in other words, if the value pb exceeds the value pa or if the value pb exceeds the value pc, the process proceeds to Step S48 where the pixel value of the pixel c is set as a prediction value.

Figure 20A:
FIG. 20A is a schematic of a prediction example obtained by performing the plane prediction method by using specific numbers.
Figure 20B:
FIG. 20B is a schematic of a prediction example obtained by performing the plane prediction method by using specific numbers.

With reference to FIGS. 20A and 20B to FIGS. 22A and 22B, characteristics of the prediction method applicable to the present embodiment described above will now be considered. FIGS. 20A and 20B are examples predicted by the plane prediction method by using specific numbers. FIG. 20A is an example of an image in which correlation is high in the horizontal direction. In the example in FIG. 20A, pixel values of the pixel b and the pixel c aligned in the horizontal direction are both "100", and pixel values of the pixel a and the attention pixel are both "20". In the plane prediction method, by using the formula (3) described above, a prediction value of the pixel value of the attention pixel=a+b−c=20+100−100=20. Accordingly, the prediction value matches with the pixel value of the attention pixel, and a prediction error relative to the pixel value of the attention pixel becomes "0".

FIG. 20B is an example of an image in which correlation is high in the vertical direction. In the example in FIG. 20B, pixel values of the pixel a and the pixel c aligned in the vertical direction are both "80", and pixel values of the pixel b and an attention pixel $G_{DATA}$ are both "30". In the plane prediction method, by using the formula (3) described above, a prediction value of the attention pixel=80+30−80=30. Accordingly, the prediction value matches with the pixel value of the attention pixel, and similarly, a prediction error relative to the pixel value of the attention pixel becomes "0".

Figure 21A:
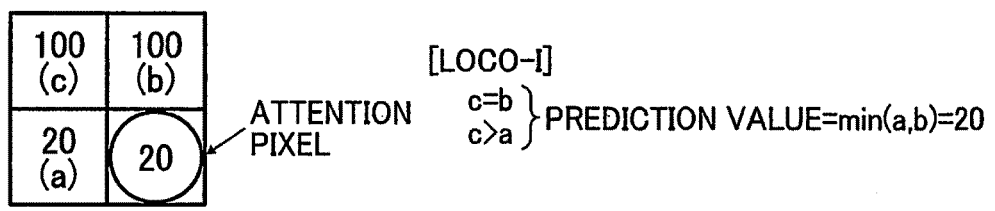
FIG. 21A is a schematic of a prediction example obtained by performing the LOCO-I method by using specific numbers.
Figure 21B:
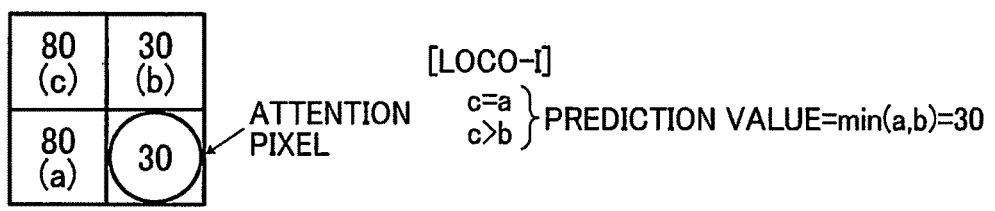
FIG. 21B is a schematic of a prediction example obtained by performing the LOCO-I method by using specific numbers.

FIGS. 21A and 21B are prediction examples predicted by the LOCO-I method by using specific numbers. The pixels a, b, and c, and the pixel value of the attention pixel are the same as those in FIGS. 20A and 20B. In an example in FIG. 21A in which correlation is high in the horizontal direction, the flowchart in FIG. 18 described above is referred to. Because at Step S30, the pixel values of the pixel c and the pixel b are equal, and the pixel value of the pixel c is larger than the pixel a, the process proceeds to Step S31. Because the pixel value of the pixel a is smaller than the pixel b, a prediction value is considered as "20", that is the pixel value of the pixel a. Because the pixel value of the attention pixel is "20", a prediction error becomes "0". An operator min in FIGS. 21A and 21B indicates that a smaller value in the parentheses is to be selected.

In an example of an image in FIG. 21B in which correlation is high in the vertical direction, the flowchart in FIG. 18 described above is referred to. Because it is determined at Step S30 that pixel values of the pixel a and the pixel c are equal, and a pixel value of the pixel c is larger than the pixel b, the process proceeds to Step S31. Because the pixel value of the pixel b is smaller than the pixel a, a prediction value is considered as "30" that is the pixel value of the pixel b. Because the pixel value of the attention pixel is "30", a prediction error becomes "0".

Figure 22A:
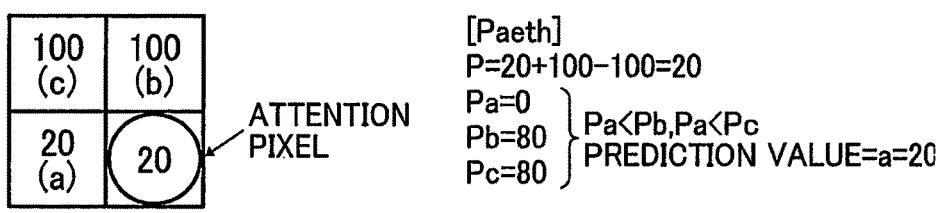
FIG. 22A is a schematic of a prediction example obtained by performing the Paeth method by using specific numbers.
Figure 22B:
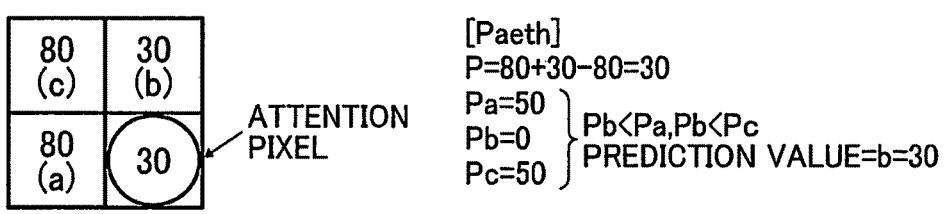
FIG. 22B is a schematic of a prediction example obtained by performing the Paeth method by using specific numbers.

FIGS. 22A and 22B are examples of performing prediction by using the Paeth method. The pixels a, b, and c, and the pixel value of the attention pixel are the same as those in FIGS. 20A and 20B described above.

In an example of an image in FIG. 22A in which correlation is high in the horizontal direction, the flowchart in FIG. 19 described above is referred to. Because a pixel value of the pixel a is "20", and pixel values of the pixel c and the pixel b are both "100", when a value p is calculated from the pixel values of the pixels a, b, and c at Step S40, a value p=20+100−100=20. When the values pa, pb, and pc are calculated by using the value p at Steps S41 to S43, the value pa=0, the value pb=80, and the value pc=80. Because it is determined at Step S44 that the value pa is equal to or less than the values pb and pc, the value a=20 is set as a prediction value. Because the pixel value of the attention pixel is "20", a prediction error becomes "0".

In an example in FIG. 22B in which correlation is high in the vertical direction, the flowchart in FIG. 19 described above is referred to. Because the pixel values of the pixel a and the pixel c are both "80", and the pixel value of the pixel b is "30", when a value p is calculated from the pixel values of the pixels a, b, and c, it is determined at Step S40 that the value p=80+30−80=30. If values pa, pb, and pc are calculated by using the value p at Steps S41 to S43, the value pa=50, the value pb=0, and the value pc=50. Because at Step S44, the value pa is larger than the value pb, the process proceeds to Step S46. Because the value pb is smaller than the values pa and the value pc at Step S46, the value b=30 is determined as a prediction value. Because the pixel value of the attention pixel is "30", a prediction error becomes "0".

In this manner, in any one of the plane prediction method, the LOCO-I method, and the Paeth method, the prediction error becomes "0", when correlation of an image is high in the vertical direction or the horizontal direction.

Figure 23A:
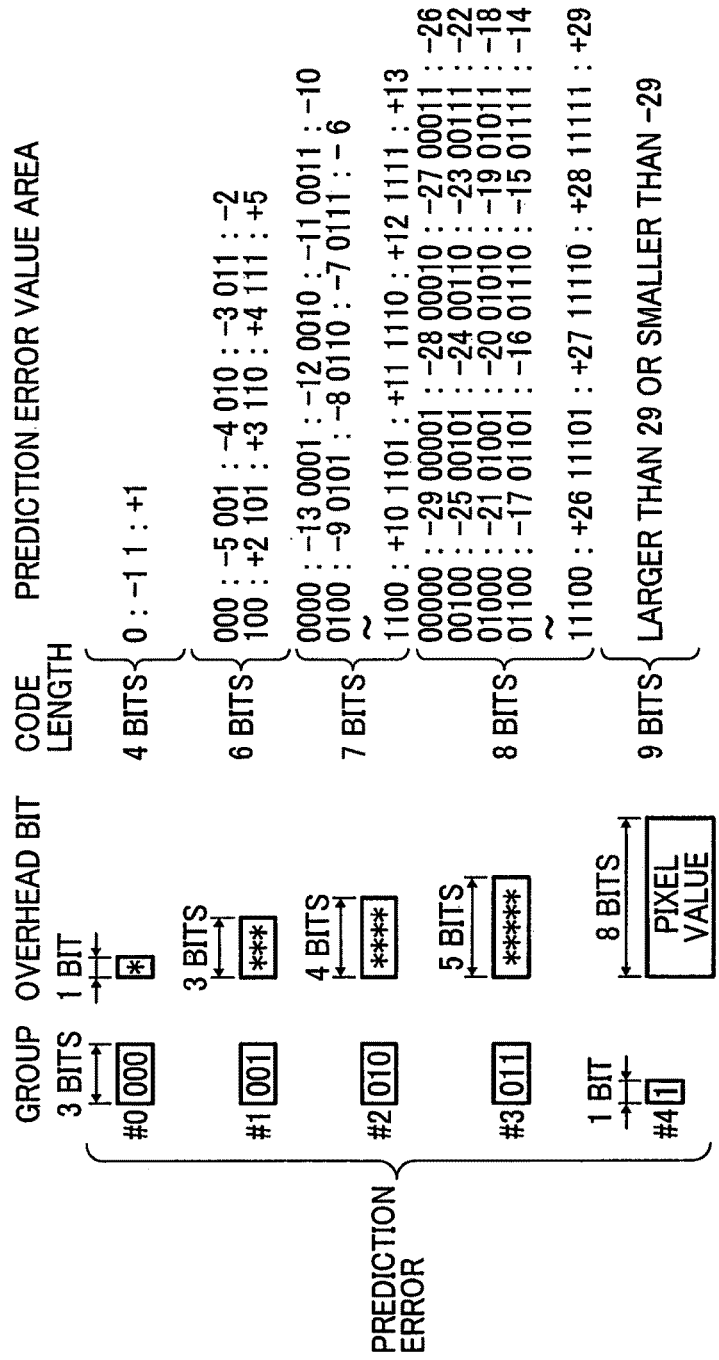
FIG. 23A is a schematic of a format of an example of codes in the present embodiment.
Figures 23B, 23C, 24:
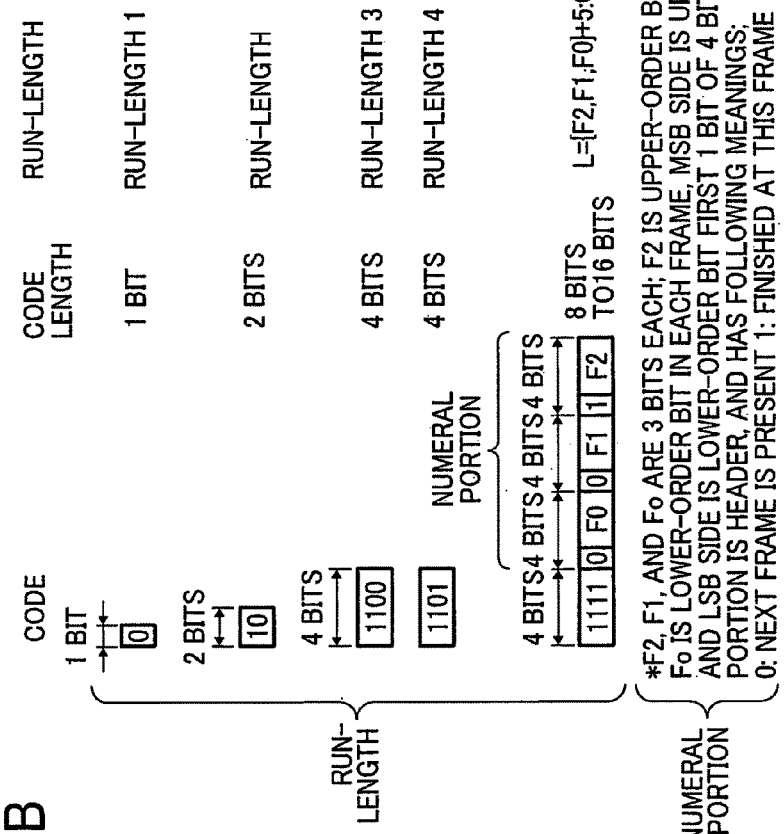
FIG. 23B is a schematic of a format of an example of codes in the present embodiment.
FIG. 23C is a schematic of a format of an example of a code in the present embodiment.
FIG. 24 is a schematic of a format of an example of a code in the present embodiment.

Code Format:

With reference to FIGS. 23A and 23B, and FIG. 24, a format of an example of codes generated by the code format generation processing unit 406 will now be described. In the present embodiment, a prediction error value and a run-length value are both to be encoded. As illustrated in FIG. 24, an encoded run-length value (referred as run-length code) is connected behind an encoded prediction error value (referred to as prediction error code), thereby generating a code string using a set of the prediction error code and the run-length code as a unit.

FIG. 23A is a code format of an example of prediction error codes. In the present embodiment, the prediction error values are Huffman encoded so that the frequency is reduced as the value is increased. At this time, prediction error values are grouped relative to ranges set in a stepwise manner, and encoded so that a different code length is allocated for each group. The groups are identified by using codes of a bit number corresponding to the number of groups from the top of the Huffman code being generated. In the present embodiment, prediction error values are classified into five groups including four groups that use three bits for identifying the group, and one group that uses one bit for identifying the group and uses the pixel value without change as a code.

In the following, a bit used for identifying the group is referred to as a group identification bit, and a bit added to the group identification bit is referred to as an overhead bit. A unique Huffman code is formed for each prediction error value, by using the group identification bit of three bits and the overhead bit.

In the present embodiment, for example, the ranges are set for prediction error values Pe as follows, and the prediction error values Pe are classified into eight groups from a group #0 to a group #7.

Group #0 (code length of 4 bits):Pe=1, Pe=−1
Group #1 (code length of 6 bits):−5≦Pe≦−2, 2≦Pe≦5
Group #2 (code length of 7 bits):−13≦Pe≦−6, 6≦Pe≦13
Group #3 (code length of 8 bits):−29≦Pe≦−14, 14≦Pe≦29
Group #4 (code length of 9 bits):Pe≦−30, 30≦Pe The group identification bit of each group and the bit length of the overhead bit are set, for example, as follows:

Group #0: group identification bit="000", overhead bit length=1 bit
Group #1: group identification bit="001", overhead bit length=3 bits
Group #2: group identification bit="010", overhead bit length=4 bits
Group #3: group identification bit "011", overhead bit length=5 bits
Group #4: group identification bit "1", overhead bit length=8 bits Accordingly, the code length of each group is given as follows:

Group #0: code length=4 bits
Group #1: code length=6 bits
Group #2: code length=7 bits
Group #3: code length=8 bits
Group #4: code length=9 bits In the group #4, if a prediction error value of the attention pixel is smaller than "−29" or larger than "29", a pixel value of the attention pixel is used without change as the overhead bit, without using the Huffman code. This is to prevent the code length of the prediction error value from increasing more than eight bits, and reducing compression ratio. A code formed of the group identification bit and the overhead bit using the pixel value in the group #4 without change is called a PASS code. Similar to the prediction error code, the PASS code is connected before the run-length code.

FIG. 23B is a code format of an example of the run-length codes. In the present embodiment, run-length values are Huffman encoded so that the shorter code length is allocated to the smaller value. If a run-length value is "1", a code length of 1-bit is allocated, and encoded into a code "0". If a run-length value is "2", a code length of 2 bits is allocated, and encoded into a code "10". If a run-length value is "3" or "4", a code length of 4 bits is allocated, and encoded into a code "1100" or a code "1101".

If a run-length value is equal to or more than "5", the run-length value is encoded into a form in which a numeral portion of a predetermined code length is connected after a code "1111" having a code length of 4 bits. The numeral portion is made of four frames at maximum in which a code length of 4 bits including a header of 1 bit at the top is included, as indicated at a lower stage in FIG. 23B. In other words, the run-length value has a code length of 16 bits at maximum. A code indicating the run-length value is divided into every three bits, and relative to the three bits excluding the header of each frame, the side of the code "1111" described above is packed to be the most significant bit (MSB). In an example in FIG. 23B, because the maximum number of frames is four, the run-length values can be expressed up to "516". If the run-length value is "5", it is possible to omit the frame.

The header indicates whether a certain frame is followed by the next frame. For example, a header value "0" indicates the presence of the next frame, and a header value "1" indicates that the frame is the last frame.

FIG. 23C is an example of a line header code indicating that it is the top of the line. In the example, the line header code is fixed to a code "1110", and is placed before the prediction error code.

Figure 25:
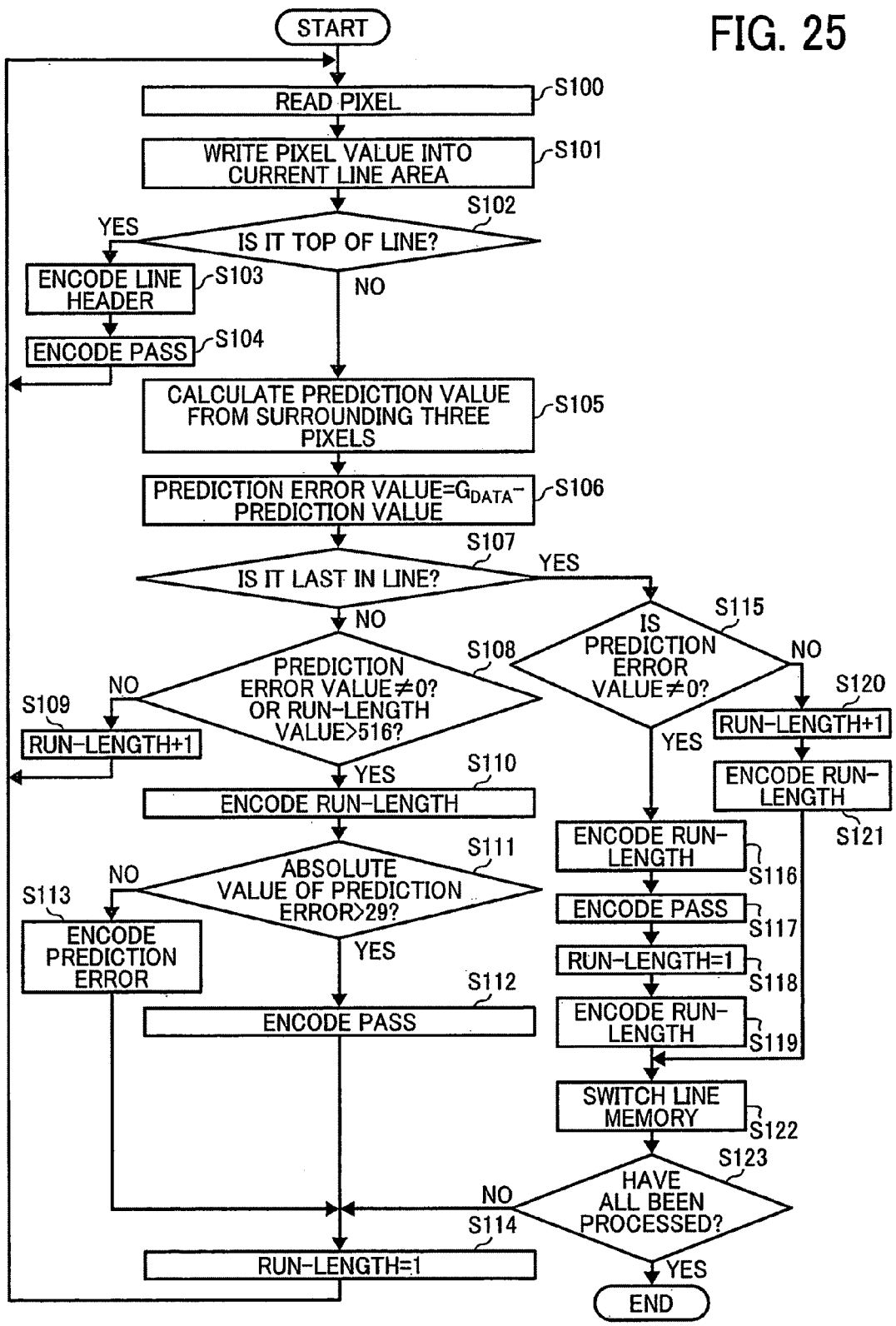
FIG. 25 is a flowchart of an example of an encoding process performed by an encoding unit in the present embodiment.

Details of Encoding Process:

FIG. 25 is a flowchart of an'example of an encoding process performed by the encoding unit 132 in the present embodiment. Prior to the process of the flowchart in FIG. 25, the run-length is assumed to have been reset to "1" in advance.

At Step S100, the image reading unit 400 reads out one pixel (referred to as attention pixel $G_{DATA}$) to be processed from the multi-valued CMYK band data storage area 120 of the main memory 103. The line memory controlling unit 401 controls the read attention pixel $G_{DATA}$ to be written into an area of the line memory 402 where the current line is to be written (Step S101). In the following, an area of the line memory 402 where the current line is to be written is referred to as a current line area, and an area where the previous line is to be written is referred to as a previous line area.

At the next Step S102, whether the attention pixel $G_{DATA}$ is a top pixel of the line is determined. If the attention pixel $G_{DATA}$ is the top pixel of the line, the process proceeds to Step S103 where a line header code is encoded, thereby outputting the line header code. At Step S104, a PASS code is encoded by the pixel value of the attention pixel $G_{DATA}$ thereby outputting the PASS code. When the PASS code is encoded at Step S104, return to Step S100, and the next pixel is set as the attention pixel $G_{DATA}$.

If at Step S102 the attention pixel $G_{DATA}$ is not the top pixel of the line, the process proceeds to Step S105.

At Step S105, pixel data of three pixels a, b, and c surrounding the attention pixel $G_{DATA}$ is read out from the line memory 402, and a pixel value of the attention pixel $G_{DATA}$ is predicted from the pixel values of the pixels a, b, and c, by using the prediction method such as the plane prediction method, the LOCO-I method, or the Paeth method. At Step S106, the prediction value predicted at Step S105 is reduced from the pixel value of the attention pixel $G_{DATA}$, thereby calculating an error of a prediction value (prediction error value) relative to the attention pixel $G_{DATA}$.

When the prediction error value is calculated at Step S106, the process proceeds to Step S107 where whether the attention pixel $G_{DATA}$ is the last pixel of the line is determined. If the attention pixel $G_{DATA}$ is not the last pixel of the line, the process proceeds to Step S108. At Step S108, whether the prediction error value is a value other than "0", or whether the run-length value exceeds a value "516" that is the upper limit of the run-length code described with reference to FIG. 23B is determined.

If at Step S108 the run-length value is equal to or less than the value "516", and the prediction error vale is "0", the process proceeds to Step S109 where a value "1" is added to the run-length value. Then the process returns to Step S100 where the next pixel is set as the attention pixel $G_{DATA}$.

If at Step S108 the prediction error value is a value other than "0", or the run-length value exceeds the value "516", the process proceeds to Step S110. At Step S110, a run-length value is encoded based on the encoding format illustrated in FIG. 23B described above, thereby outputting a run-length code. Then the process proceeds to Step S111.

At Step S111, whether an absolute value of the prediction error value exceeds "29" is determined. If the absolute value of the prediction error value exceeds "29", the process proceeds to Step S112. At Step S112, a PASS code that uses the pixel value of the attention pixel $G_{DATA}$ without change as a code is encoded based on the encoding format illustrated in FIG. 23A, thereby outputting the PASS code. If at Step S111 the absolute value of the prediction error value is equal to or less than "29", the process proceeds to Step S113. At Step S113, the prediction error value relative to the attention pixel $G_{DATA}$ is encoded based on the encoding format illustrated in FIG. 23A described above, thereby outputting the prediction error code.

After finishing encoding process performed at Step S112 or Step S113, the process proceeds to Step S114 where the run-length value is reset to "1". When the run-length value has been reset, the process proceeds to Step S100 where the next pixel is set as the attention pixel $G_{DATA}$.

If at Step S107 the attention pixel $G_{DATA}$ is the last pixel of the line, the process proceeds to Step S115. At Step S115, whether a prediction error value relative to the attention pixel $G_{DATA}$ is a value other than "0" is determined.

If at Step S107 the prediction error value is a value other than "0", the process proceeds to Step S116. In this case, a run-length value is encoded at Step S116, thereby outputting a run-length code. At the next Step S117, a PASS code is encoded by using the pixel value of the attention pixel $G_{DATA}$ without change, thereby outputting the PASS code. At the next Step S118, the run-length value is reset to "1", and the run-length value of the value "1" is encoded at Step S119.

At Step S115, if the prediction error value is "0", the process proceeds to Step S120. At Step S120, "1" is added to the run-length value. At the next Step S121, a run-length value is encoded based on the encoding format illustrated in FIG. 23B described above, thereby outputting a run-length code.

When encoding of the run-length value at Step S119 or Step S121 is finished, the process proceeds to Step S122. At Step S122, the previous line area and the current line area in the line memory 402 are switched. In other words, the line memory controlling unit 401 switches the previous line area where the encoded line is stored in the line memory 402 to the current line area. The line memory controlling unit 401 then makes pixel data of the line to be encoded next to be stored in the switched current line area. In addition, the line memory controlling unit 401 switches the current line area where the line of the current attention pixel $G_{DATA}$ in the line memory 402 is stored, to the previous line area where the encoded previous line is stored.

When switching of areas in the line memory 402 is finished at Step S122, the process proceeds to Step S123 where whether the processes on all the pixels in the image are finished is determined. If the processes on all the pixels are finished, a series of encoding process is finished.

If at Step S123 the processes on all the pixels are not yet finished, the process returns to Step S114 where the run-length value is reset to "1". Then the process returns to Step S100 where a process is performed by using the next pixel as the attention pixel $G_{DATA}$.

Specific Example of Encoding

An example of encoding performed based on a flowchart in FIG. 25 described above will now be explained in more detail with reference to FIGS. 26A and 26B and FIGS. 27A to 27D. The LOCO-I method is used as the prediction encoding method. In the previous line and the current line, it is considered that a pixel of No. #0 is the top pixel, and a pixel of No. #15 is the last pixel. In FIGS. 26A and 26B and FIGS. 27A to 27D, a numeral in a cell indicates a pixel value. In the following, a "pixel of No. #n" is referred to as a "pixel #n".

The encoding process of a graphic image in the present embodiment will now be described with reference to the flowchart in FIG. 25 and FIGS. 26A and 26B. FIG. 26A is a specific example of values, when a graphic image is encoded. In FIG. 26A, a prediction value, a pixel value, and a prediction error value are correspondingly indicated with the pixel. A pixel code (PASS code and prediction error code) and a run-length code are aligned in an output order. Because the graphic image is generally generated based on a predetermined rule, it is expected that a number of pixels having the same pixel values are arranged in series.

If the pixel of No. #0 that is the top pixel of the current line is the attention pixel $G_{DATA}$, it is determined at Step S102 that a line header is encoded (Step S103), and PASS encoding is performed by using a pixel value of the pixel #0 without change, thereby outputting a PASS code (Step S104). The attention pixel $G_{DATA}$ moves to a pixel #1 in the current line.

A prediction value of the pixel #1 of the current line is predicted as "30" by the LOCO-I described with reference to FIG. 18, and is matched with the pixel value of the pixel #1. Accordingly, a prediction error value becomes "0". Consequently, it is determined at Step S108 that the run-length value is to be added only by one and becomes "2" at Step S109. The attention pixel $G_{DATA}$ then moves to a pixel #2 in the current line.

A prediction value of the pixel #2 of the current line is "30", and a prediction error value relative to the pixel value of the pixel #2 becomes "–5". Accordingly, it is determined at Step S108 that the run-length value "2" is encoded at Step S110, thereby outputting a run-length code. Because an absolute value of the prediction error value is equal to or less than "29", it is determined at Step S111 that the prediction error value is encoded at Step S113, thereby outputting a prediction error code. The run-length value is reset to "1" at Step S114, and a pixel #3 of the current line becomes the attention pixel $G_{DATA}$.

A prediction value of the pixel #3 of the current line is "25", and is matched with the pixel value of the pixel #3. Accordingly, a prediction error value becomes "0". It is determined at Step S108 that the run-length value is added only by one and becomes "2" at Step S109. The attention pixel $G_{DATA}$ moves to a pixel #4 in the current line.

The pixels from a pixel #4 to a pixel #12 in the current line have high correlation in the vertical direction between the previous line and the current line. Accordingly, as described with reference to FIG. 21B, the prediction value obtained by performing the LOCO-I method and the pixel value of the attention pixel $G_{DATA}$ are matched, and respective prediction error values become "0". As a result, the run-length values are added by "one" in the processes of the pixels from the pixel #4 to the pixel #12 in the current line.

A prediction value of a pixel #13 of the current line is "30", and a prediction error value relative to the pixel value "90" of the pixel #13 becomes "60". Accordingly, it is determined at Step S108 that the run-length value is encoded at Step S110, thereby outputting a run-length code. In this case, a run-length value "10" obtained by sequentially adding in the processes from the pixel #3 to the pixel #12 in the current line is encoded and output.

Because the prediction error value of the pixel #13 of the current line is "60", it is determined at Step S111 that the absolute value exceeds "29", and PASS encoding is performed by using the pixel value of the pixel #13 without change, thereby outputting a PASS code (Step S112). The run-length value is then reset to "1", and the attention pixel $G_{DATA}$ moves to a pixel #14 in the current line.

A prediction value of the pixel #14 of the current line is "90", and is matched with the pixel value of the pixel #14. Accordingly, a prediction error value becomes "0". It is determined at Step S108 that the run-length value is added only by one and becomes "2" at Step S109. The attention pixel $G_{DATA}$ then moves to a pixel #15 in the current line.

Because the pixel #15 of the current line is the last pixel in the current line, it is determined at Step S107 to proceed to Step S115. A prediction value of the pixel #15 is "90", and is matched with the pixel value of the pixel #15. Accordingly, a prediction error value becomes "0". Consequently, it is determined at Step S115 that the run-length value is added by "1" and becomes "3" at Step S120. The run-length value "3" is encoded at Step S121, thereby outputting a run-length code, and the process is moved to the next line.

FIG. 26B is an example of a code string generated as a result of the process described above. The code string is formed by sequentially arranging a line header, a PASS code indicating a value "30", a run-length code indicating a run-length value "2", a prediction error code indicating a value "–5", a run-length code indicating a run-length value "10", a PASS code indicating a value "90", and a run-length code indicating a run-length value "3".

With reference to the flowchart in FIG. 25 and FIGS. 27A to 27D, the encoding process of a natural image in the present embodiment will now be described in more detail. Because the natural image is not generated based on a predetermined rule as the graphic image, as illustrated in FIG. 27A, it is assumed that various values are taken depending on pixels. If pixel values of the adjacent pixels do not match at all, it is probable that prediction obtained by performing the prediction process is not correct. Accordingly, for example, prediction error values of all the pixels may take values other than "0", and run-length may not be generated. In this case, a high compression ratio cannot be expected. In the encoding format described above, if all the pixel values are equal to or more than a value "30", PASS codes are used for all the pixels. Accordingly, the result may be similar to that when compression is not practically applied at all.

As described above, in the present embodiment, when a drawing image is generated from a source image of the natural image, the source image is enlarged to equal to or more than twice its original size or the source image is temporary reduced by a predetermined reduction ratio and then enlarged to twice the size, by using the nearest neighbor method. Accordingly, the generated drawing image is formed of a set of pixels in which pixel values of two or more continuous pixels in the vertical direction or the horizontal direction are matched.

As an example, when an image having a pixel formation illustrated in FIG. 27A is enlarged to twice the size by using the nearest neighbor method, an image having the same pixel values with 2 pixels×2 pixels as a unit is generated based on all the pixel values of the image before being enlarged as illustrated in FIG. 27B. As described with reference to FIGS. 20A and 20B to FIGS. 22A and 22B, in the plane prediction method, the LOCO-I method, and the Paeth method, a prediction error value becomes "0", when the correlation of the pixel values is high in the vertical direction or the horizontal direction. Accordingly, in the pixel formation illustrated in FIG. 27B, a compression ratio equal to or more than a predetermined value is ensured.

This will be described in more detail with reference to FIGS. 27B, 27C, and 27D. In an image illustrated in FIG. 27B enlarged by using the nearest neighbor method, a line including the origin of enlargement (pixel at the upper left corner in FIG. 27B) is a line #0, and the number of lines is sequentially increased as a line #1, a line #2, and the like in the downward direction of the image. In FIGS. 27C and 27D, a prediction value, a pixel value, and a prediction error value are correspondingly indicated with the pixel. The pixel code (PASS code and prediction error code) and the run-length code are aligned in an output order.

FIG. 27C is an example when a unit of pixels having the same pixel values extends over a pair of previous line and current line. In the example, because the unit is 2 pixels×2 pixels, the previous line is an odd-numbered line and the current line is an even-numbered line. In this case, correlation in the horizontal direction is high in the units, and the correlation in the vertical direction is low between the units. Accordingly, based on the determination at Step S108 in the flowchart in FIG. 25, if the attention pixel $G_{DATA}$ is a pixel other than the top of the unit, the prediction error value becomes "0", and the run-length value is increased only by "1".

If the attention pixel $G_{DATA}$ is the first pixel of the current line in the unit, the prediction error value does not become "0". In this case, based on the processes from Step S110 to Step S113, a run-length value is encoded, thereby outputting a run-length code, and PASS encoding or encoding on a prediction error value is performed, thereby outputting a PASS code or a prediction error code. In other words, if a unit of pixels having the same pixel values extends over a pair of previous line and current line, the prediction error value does not become "0" in each of the first pixel of the current line in the unit. Accordingly, a prediction error code and a run-length code may be output.

In the example in FIG. 27C, it is determined at Step S102 in the flowchart of FIG. 25 that PASS encoding is performed on the top pixel #0 of the current line, thereby outputting a PASS code. A prediction value of the next pixel #1 becomes "0" by the prediction performed by the LOCO-I method, and because the pixel value is "0", the prediction error value becomes "0". Accordingly, it is determined at Step S108 that the run-length value is increased only by "1" and becomes a value "2".

A prediction value of the pixel #2 in the next unit is "0", and because the pixel value is "90", the prediction error value becomes "90". Accordingly, a run-length value is encoded at Step S110, thereby outputting a run-length code. It is determined at Step S111 that PASS encoding is performed by using the pixel value of the pixel #2, thereby outputting a PASS code. A prediction value of the next pixel #3 is "90", and because the pixel value is "90", the prediction error value becomes "0". Accordingly, it is determined at Step S108 that the run-length value is increased only by "1" and becomes a value "2". After this, every time the unit is switched by the pixels having the same pixel values, the output of the PASS code or the prediction error code, and the output of the run-length code are repeated.

In this case, under the worst condition, the prediction error values generated when the attention pixel $G_{DATA}$ is the top pixel of the unit all become a value equal to or more than "30", and the PASS code and the run-length code indicating a run-length value "2" are output repeatedly. Accordingly, the compression ratio under the worst condition is approximately 1/2.

FIG. 27D is an example when a pair of previous line and current line is included in a unit of pixels having the same pixel values. In this example, the previous line is an even-numbered line and the current line is an odd-numbered line. In this case, correlation in the horizontal direction and the vertical direction are both high in the units. Accordingly, based on the characteristics of the prediction methods explained with reference to FIGS. 20A and 20B to FIGS. 22A and 22B, the prediction error value of all the pixels excluding the top pixel of the current line become "0". Consequently, PASS encoding is performed on the top pixel of the current line, thereby outputting a PASS code (from Step S102 to Step S104). A run-length code obtained by encoding a run-length value of one line is output in the last pixel of the current line (Step S107, Step S115, Step S120, and Step S121). Because the generated codes are only a line header code, a PASS code of one, and a run-length code of one, it is possible to obtain a very high compression ratio.

An image enlarged at a magnification ratio of two or more by using the nearest neighbor method has the characteristics as described above in the prediction encoding. If a unit of pixels having the same pixel values extends over a set of previous line and current line, at least a compression ratio of approximately 1/2 can be obtained. If a pair of previous line and current line is included in the unit, it is possible to obtain a very large compression ratio. Accordingly, a compression ratio of 1/4 can be ideally obtained in the entire image to be processed. In practice, because a control code and the like are added, at least a compression ratio of 1/3 can be obtained.

In this manner, in the present embodiment, a minimum compression ratio can be ensured. Accordingly, even if an image including a lot of natural images is printed, data transmission rate of the bus 220 does not exceed a predetermined value. Consequently, even if the transmission rate of the bus 220 is not very high, the transmission rate of the page code data synchronized with the printer engine 104 does not exceed the transmission rate of the bus 220.

Because a minimum compression ratio is ensured, it is possible to reduce data capacity of the main memory 103. Because the minimum compression ratio is ensured only by one compression and encoding process, there is no need to repeat the compression and encoding process. Accordingly, the printing speed of a system is not reduced.

At Step S62 in FIG. 8, the source image is enlarged corresponding to the magnification ratio and then reduced to 1/2. However, the present embodiment is not limited thereto. In other words, if n is an integer equal to or more than 2, the source image may be reduced to 1/n times at Step S62. In this case, at Step S64, the reduced source image is enlarged to n times by using the nearest neighbor method.

In the above description, the plane prediction method, the LOCO-I method, and the Paeth method are used as a prediction method applicable to the prediction processing unit 403. However, the prediction method is not limited thereto. In other words, in the prediction processing unit 403, the other methods are also applicable to any prediction method in which the prediction error value becomes "0", if the pixel values of the image are matched in the vertical direction or in the horizontal direction.

In the above description, the processes from Step S62 to Step S64 in FIG. 8 are performed, if the magnification ratio is less than two, and the source image is temporarily reduced and is enlarged to twice the size by using the nearest neighbor method. This is also applicable when the magnification ratio is equal to or more than two. However, if the magnification ratio is equal to or more than two, the enlargement of the source image by the nearest neighbor method is directly performed on the source image by the process at Step S61. Accordingly, there is no need to temporarily reduce a source image and then enlarge the source image to twice the size by using the nearest neighbor method.

In the above description, a run-length value that indicates how many of the pixel value of the attention pixel and the prediction value relative to the pixel value of the attention pixel are matched is calculated, and the run-length value is then encoded. However, the present embodiment is not limited thereto. In other words, even if the run-length value is not calculated, if the pixel value of the attention pixel and the prediction value relative to the pixel value of the attention pixel are matched, it is possible to obtain a high compression ratio, by performing Huffman encoding with a small number of bits.

Figure 28:
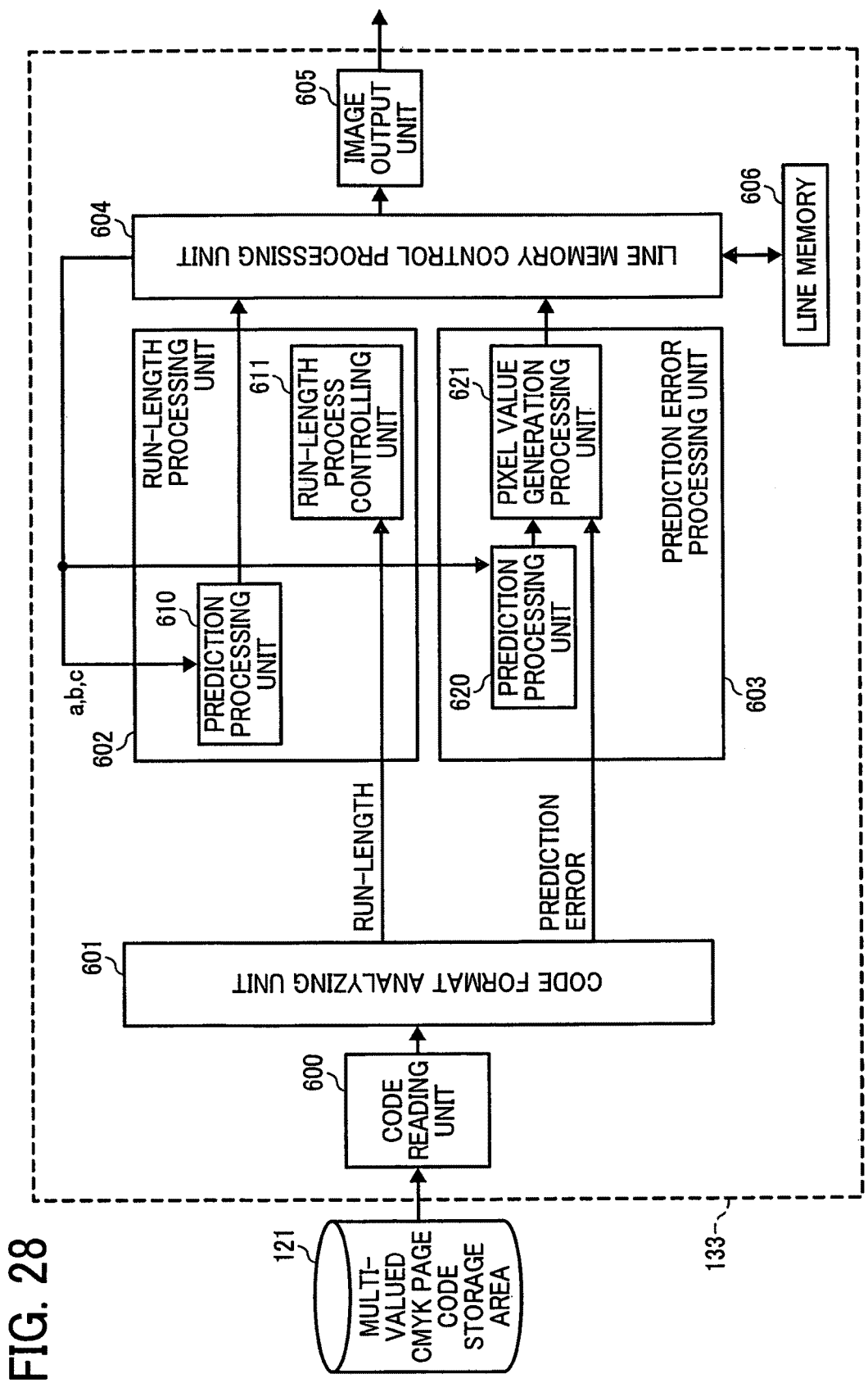
FIG. 28 is a schematic of an example of a decoding unit in the present embodiment.

Outline of Decoding Process:

FIG. 28 is a schematic of an example of the decoding unit 133 in the present embodiment. A code reading unit 600 reads out code data from the multi-valued CMYK page code storage area 121 of the main memory 103, and transfers the code data to a code format analyzing unit 601. The code format analyzing unit 601 analyzes the transferred code data based on the rules of Huffman code, and extracts the line header code, the prediction error code or the PASS code, and the run-length code.

The code format analyzing unit 601 determines the top of line based on an extracted line header code. The code format analyzing unit 601 calculates a prediction error value based on the extracted prediction error code, and calculates a pixel value based on the PASS code. The code format analyzing unit 601 also calculates a run-length value based on the extracted run-length code.

In other words, if the read code data is four bits of "1110", the code format analyzing unit 601 determines that the bit is the line header code. The code format analyzing unit 601 sequentially reads out the bits continued after the line header code, determines a prediction error code or a PASS code, and calculates a prediction error code or a pixel value. The code format analyzing unit 601 also sequentially reads the bits continued after the prediction error code or the PASS code, determines a run-length code, and calculates the run-length value. The code format analyzing unit 601 then sequentially reads the bits continued after the run-length code, determines a prediction error code or a PASS code, and calculates a prediction error value or a pixel value. Determination of the prediction error code, the PASS code, and the run-length code and output of values are repeated until the next line header code is read. If the line header code is read, the similar processes are repeated relative to the next line.

In a prediction error processing unit 603, a prediction processing unit 620 predicts a pixel value of an attention pixel to be decoded, based on pixel data of the decoded pixels a, b, and c (see FIG. 16) of the three pixels surrounding a pixel to be decoded (attention pixel), read out from a line memory 606 by a line memory control processing unit 604, by using the prediction method (in the present embodiment, the plane prediction method, the LOCO-I method, or the Paeth method) used for encoding. In the prediction error processing unit 603, a pixel value generation processing unit 621 generates a pixel value of the attention pixel, by adding a prediction error value obtained by the code format analyzing unit 601 and a prediction value predicted by the prediction processing unit 620.

In a run-length processing unit 602, similar to the prediction processing unit 620 described above, a prediction processing unit 610 predicts a pixel value of an attention pixel, based on the pixel values of the decoded pixels a, b, and c, of the three pixels surrounding the attention pixel, supplied from the line memory control processing unit 604. A run-length process controlling unit 611 controls pixels of the predicted pixel values to be output as many as the number indicated by the run-length value calculated by the code format analyzing unit 601.

The line memory 606 can store therein pixel data of two lines of a line at which decoding is currently performed (referred to as a current line) and a decoded line at which decoding has finished immediately before (referred to as a previous line). In the following, an area where the current line of the line memory 606 is to be written is called a current line area, and an area where the previous line is to be written is called a previous line area. The line memory control processing unit 604 controls reading and writing of pixels relative to the line memory 606. For example, the line memory control processing unit 604 reads out the three pixels a, b, and, c surrounding the attention pixel from the line memory 606, and supplies to the prediction error processing unit 603 and the run-length processing unit 602 described above.

The pixel decoded by the run-length processing unit 602 and the prediction error processing unit 603 is transferred to an image output unit 605 by the line memory control processing unit 604, and is output from the decoding unit 133. The output of the decoding unit 133 is transferred to an image processing unit 134.

Figure 29:
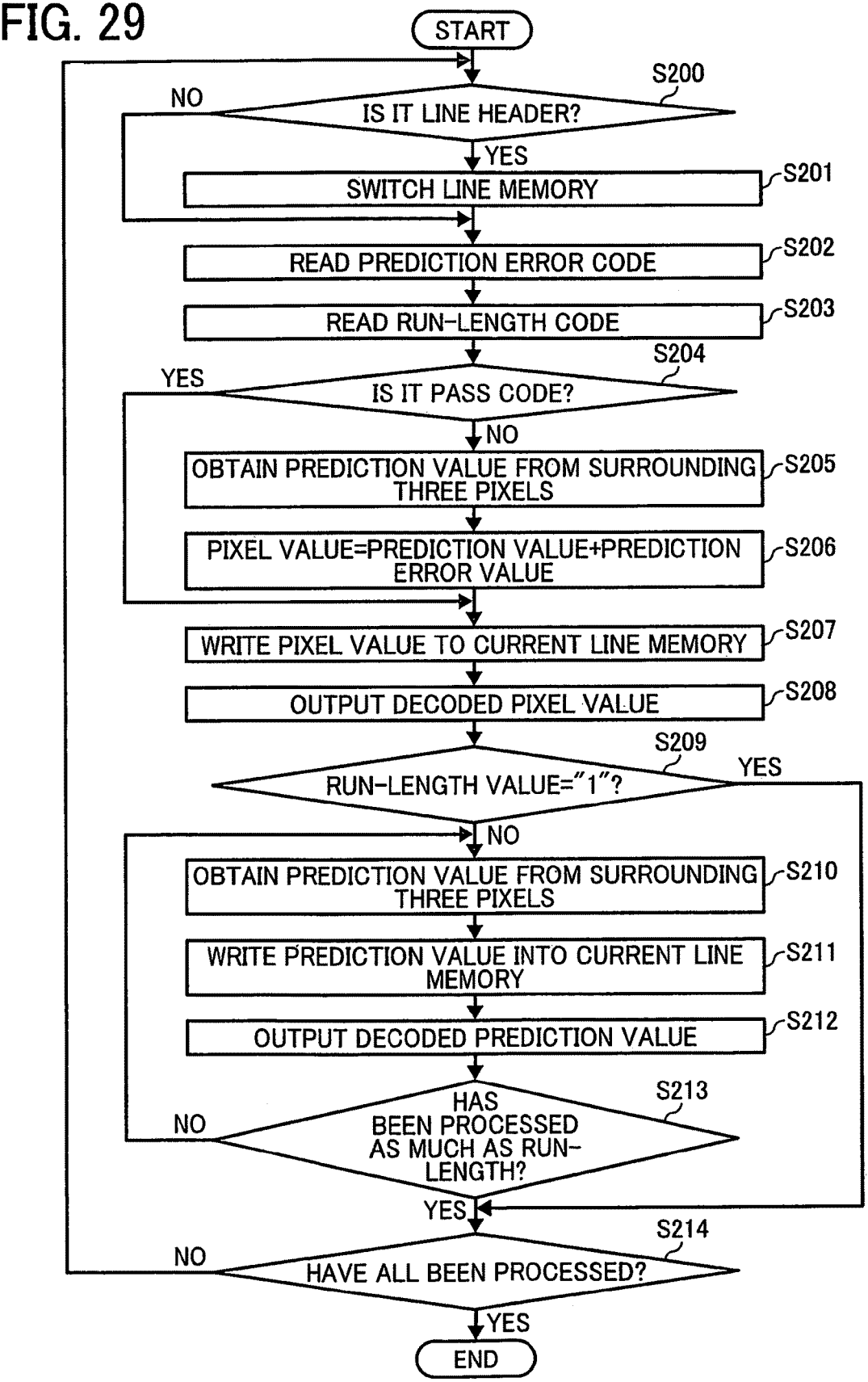
FIG. 29 is a flowchart of an example of a decoding process relative to encoded data encoded by the encoding process in the present embodiment, performed by the decoding unit.
Figure 30:
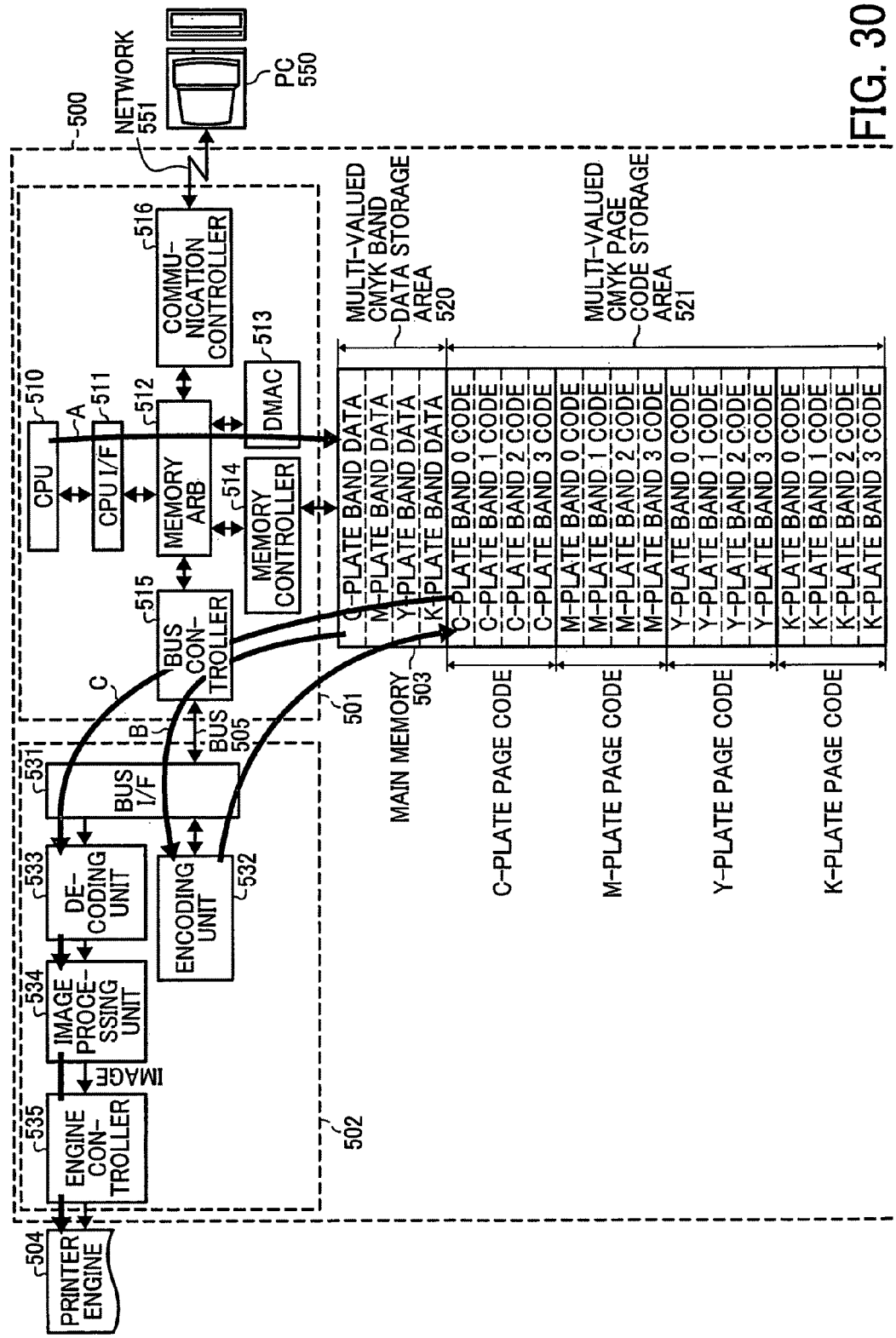
FIG. 30 is a schematic for explaining a general data flow in a printing device when image data is compressed and encoded.

Details of Decoding Process:

FIG. 29 is a flowchart of an example of a decoding process relative to encoded data encoded by the encoding process in the present embodiment, performed by the decoding unit 133. Code data read out from the multi-valued CMYK page code storage area 121 of the main memory 103 by the code reading unit 600 is transferred to the code format analyzing unit 601. The code format analyzing unit 601 determines whether the transferred code data is a line header code (Step S200). If the transferred code data is not the line header code, the process proceeds to Step S202. At Step S202, a prediction error code or a PASS code is extracted and read out from the transferred code data, and at the next Step S203, a run-length code arranged continuously to the prediction error code or the PASS code is extracted.

If at Step S200 the transferred code data is determined as a line header code, the process proceeds to Step S201 where the previous line area and the current line area in the line memory 606 are switched. When the switching in the line memory 606 is finished, the process proceeds to Step S202 described above.

If a run-length code is extracted at Step S203, the process proceeds to Step S204 where whether the code data extracted at Step S202 is a PASS code is determined. If the top 1 bit of the code data is "1", the code data is determined as a PASS code. In this case, a pixel value of the attention value is extracted from the PASS code. Then the process proceeds to Step S207.

If at Step S204 the code data extracted at Step S202 is not a PASS code, the process proceeds to Step S205. At Step S205, a pixel value of an attention pixel is predicted from the three pixels a, b, and c (see FIG. 16) surrounding the attention pixel. For example, the prediction processing unit 620 in the prediction error processing unit 603 reads out pixels a, b, and c from the line memory 606 through the line memory control processing unit 604, and predicts a pixel value of an attention pixel from the pixels a, b, and c, by using the prediction method used for encoding.

If a pixel value of the attention pixel is predicted at Step S205, the process proceeds to Step S206. In this case, it is determined at Step S204 described above that the code data read at Step S202 is a prediction error code. At Step S206, the prediction error code is decoded into a prediction error value, and a pixel value of the attention pixel is generated by adding the prediction error value and the prediction value predicted at Step S205.

At the next Step S207, the line memory controlling processing unit 604 writes the pixel value of the attention pixel into a current memory area of the line memory 606. At the next Step S208, the pixel value of the attention pixel is output to the image output unit 605.

The process proceeds to Step S209 where whether the run-length code extracted at Step S203 is decoded into a run-length value, and whether the run-length value is "1" is determined. If the run-length value is "1", the process proceeds to Step S214, which will be described later.

If at Step S209 the run-length value is not "1", the process proceeds to Step S210. In this case, pixels having a prediction error value of "0", in other words, pixels in which the prediction value and the pixel value are matched, are aligned continuously as much as the number indicated by the run-length value. At Step S210, a pixel value of an attention pixel is predicted from the three pixels a, b, and c (see FIG. 16) surrounding the attention pixel, by using the prediction method used for encoding. For example, the prediction processing unit 610 in the run-length processing unit 602 reads out the pixels a, b, and c from the line memory 606 through the line memory control processing unit 604, and predicts the pixel value of the attention pixel from the pixels a, b, and c, by using the plane prediction.

If the pixel value of the attention pixel is predicted at Step S210, the process proceeds to Step S211 where the predicted pixel value is written into the current line area of the line memory 606 as a pixel value of the attention pixel, by the line memory control processing unit 604. The pixel value written into the line memory 606 is used as a pixel value of the pixel a during the next prediction process. At the next Step S212, the pixel value of the attention pixel is output to the image output unit 605.

At the next Step S213, whether the processes from Step S210 to Step S212 are repeated as much as the number indicated by the run-length value calculated at Step S209 is determined. If the processes are not yet repeated as much as the number indicated by the run-length value, the process proceeds to Step S210 where a generation process of an attention pixel value is performed based on the prediction value.

If at Step S213 the processes are repeated as much as the number indicated by the run-length value, the process proceeds to Step S214 and determine whether the processes are finished on all the pixels in the image. If the processes are not yet finished, the process returns to Step S200 where the next code data is read out. If processes have finished for all the pixels in the image at Step S214, a series of decoding process is finished.

In the description above, the graphic image is drawn at a resolution of 1200 dpi, and the source image of the natural image is drawn at a resolution of 600 dpi. However, it is not limited thereto. The present embodiment is also applicable, for example, if a graphic image drawn at 600 dpi and a natural image is drawn at 300 dpi, or if a graphic image is drawn at 2400 dpi and a natural image is drawn at 1200 dpi. In the description above, an example of using the CMYK drawing and the plane encoding method are explained. However, it is not limited thereto, and for example, the present embodiment is also applicable even if RGB drawing and a pixel encoding method are used.

Other Embodiment

In the above description, units of the encoding unit 132 and the decoding unit 133 of the embodiment of the present invention are formed as hardware. However, it is not limited thereto. In other words, the encoding unit 132 and the decoding unit 133 in the image processing apparatus applicable to the embodiment of the present invention can be realized as a computer program executed in the CPU 110 or another CPU (not illustrated) incorporated in the image processing apparatus.

In this case, a computer program executed as the encoding unit 132 or the decoding unit 133 in the CPU 110 or the other CPU has a modular configuration. If the computer program is executed as the encoding unit 132 explained with reference to FIG. 14, for example, the modular configuration includes the function units (the image reading unit 400, the line memory controlling unit 401, the prediction processing unit 403, the prediction error processing unit 404, the run-length generation processing unit 405, the code format generation processing unit 406, and the code writing unit 407) of the encoding unit 132.

A computer program for realizing the encoding unit 132 or the decoding unit 133, or a computer program for realizing the drawing processing unit 700 executed in the CPU 110 is recorded in a computer-readable recording medium such as a compact disk (CD), a flexible disk (FD), a digital versatile disk (DVD), in a file of an installable form or an executable form. However, the computer program is not limited thereto, and may be stored in a ROM 117 connected to the CPU 110 or a ROM (not illustrated) connected to the other CPU in advance. The computer program can also be stored in a computer connected to a network such as the Internet, and may be provided by downloading through the network. The computer program may be provided or distributed through networks such as the Internet.

As an actual hardware, the units described above are loaded in the main storage (not illustrated) by causing the CPU 110 or the other CPU to read out and execute a computer program that functions, for example, as the drawing processing unit 700 or as the encoding unit 132 or the decoding unit 133, from the recording medium described above. If a computer program functions, for example, as the drawing processing unit 700, units (the reduction processing unit 701, the enlargement processing unit 702, and the drawing unit 703) that form the drawing processing unit 700 are generated on the main storage.

In the present invention, while compression and encoding of drawing data are performed by using prediction encoding, it is possible to obtain a compression ratio of equal to or more than a predetermined value, when an image in which correlation between pixels is low is printed with higher resolution than the resolution of the image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that compresses and encodes an input image formed of multi-valued image data, the image processing apparatus comprising:
   a drawing unit configured to draw a desired image representing the input image at a magnification ratio, the drawing unit including,
      a reducing unit configured to reduce the input image to form an intermediate image by interpolating the input image such that the intermediate image has a resolution of 1/n times a resolution of a desired image, if the magnification ratio is less than two, where n is an integer greater than or equal to two, and
      an enlarging unit configured to enlarge one of the intermediate image and the input image to form the desired image by performing interpolation based on the magnification ratio such that the desired image has the magnification ratio and the desired image is defined by sets of at least two continuous pixels in one of the vertical direction and the horizontal direction that have matching pixel values;
   a predicting unit configured to calculates a prediction value relative to an attention pixel of the desired image based on a pixel value of the attention pixel and a pixel value of a pixel surrounding the attention pixel;
   a predicting error unit configured to calculates an error value of the prediction value relative to the pixel value of the attention pixel; and
   a code generating unit that encodes one of the pixel value of the attention pixel and the error value.

2. The image processing apparatus according to claim 1, wherein the enlarging unit enlarges the desired image by using a nearest neighbor method.

3. The image processing apparatus according to claim 1, further comprising:
   a run-length generating unit that generates a run-length value indicating a matching serial number of the pixel value of the attention pixel and the prediction value obtained by the predicting unit, wherein
      an average run-length value in one of the vertical direction and the horizontal direction is at least two, and
      the code generating unit encodes the pixel value of the attention pixel or the error value and the run-length value.

4. The image processing apparatus according to claim 3, wherein the code generating unit encodes the run-length value having a value of one to a 1-bit code.

5. The image processing apparatus according to claim 3, wherein the code generating unit encodes the pixel value of the attention pixel, the error value, and the run-length value using Huffman encoding.

6. The image processing apparatus according to claim 5, wherein the code generating unit Huffman-encodes the pixel value of the attention pixel, the error value, and the run-length value based on a Huffman tree independent from each other.

7. The image processing apparatus according to claim 6, wherein the code generating unit classifies the error value into groups corresponding to a range of the error value, and in a group in a range in which an absolute value of the error value is maximum among the groups, the pixel value of the attention pixel is used without change as an encoded code.

8. The image processing apparatus according to claim 7, wherein the code generating unit allocates a code with a shorter code length than that of the other groups as a code for identifying the groups, to the group in the range in which the absolute value of the error value is maximum.

9. A method for image processing by which an image formed of multi-valued image data is compressed and encoded, the method for image processing comprising:
   drawing a desired image representing the input image at a magnification ratio, the drawing including,
      reducing the input image to form an intermediate image by interpolating the input image such that the intermediate image has a resolution of 1/n times a resolution of a desired image, if the magnification ratio is less than two, where n is an integer greater than or equal to two, and
      enlarging one of the intermediate image and the input image to form the desired image by performing interpolation based on the magnification ratio such that the desired image has the magnification ratio and the desired image is defined by sets of at least two continuous pixels in one of the vertical direction and the horizontal direction that have matching pixel values;
   predicting a prediction value relative to an attention pixel of an image obtained by enlarging the image at the enlarging, based on a pixel value of the attention pixel and a pixel value of a pixel surrounding the attention pixel;
   predicting error of the prediction value by calculating an error value relative to the pixel value of the attention pixel; and
   code generating at which one of the pixel value of the attention pixel and the error value is encoded.

10. The method for image processing according to claim 9, further comprising:
    generating a run-length value indicating a matching serial number of the pixel value of the attention pixel and the prediction value obtained by the predicting unit, wherein,
       an average run-length value in one of the vertical direction and the horizontal direction is at least two, and
       the encoding encodes one of the pixel value of the attention pixel and the error value with the run-length value.

* * * * *